(12) United States Patent
Inoue et al.

(10) Patent No.: US 9,235,883 B2
(45) Date of Patent: Jan. 12, 2016

(54) INSPECTION SYSTEM AND METHOD

(71) Applicant: NuFlare Technology, Inc., Numzau-shi (JP)

(72) Inventors: Takafumi Inoue, Kanagawa (JP); Nobutaka Kikuiri, Tokyo (JP); Ikunao Isomura, Kanagawa (JP)

(73) Assignee: NuFlare Technology, Inc., Numazu-shi (JP)

(*) Notice: Subject to any disclaimer, the term of this patent is extended or adjusted under 35 U.S.C. 154(b) by 354 days.

(21) Appl. No.: 13/792,364

(22) Filed: Mar. 11, 2013

(65) Prior Publication Data
US 2013/0250095 A1 Sep. 26, 2013

(30) Foreign Application Priority Data

Mar. 22, 2012 (JP) .................................. 2012-066065

(51) Int. Cl.
*G06T 7/00* (2006.01)
*H01L 21/68* (2006.01)

(52) U.S. Cl.
CPC .............. *G06T 7/0004* (2013.01); *G06T 7/001* (2013.01); *G06T 2207/30148* (2013.01)

(58) Field of Classification Search
CPC ................. G01B 11/27; B23K 9/0956; G06T 2207/30148; G06T 7/0004; H04N 7/18; B07C 3/14; B07C 5/10; H05K 13/08; G01N 21/8806; G01N 21/8903; G01N 21/88
USPC .......... 348/86–92, 94–95; 382/141, 144, 149, 382/151
See application file for complete search history.

(56) References Cited

U.S. PATENT DOCUMENTS 4,701,859 A * 10/1987 Matsuyama .............. G03F 1/42
  257/E21.211
4,737,920 A * 4/1988 Ozawa .......................... 356/394
(Continued)

FOREIGN PATENT DOCUMENTS

JP 2001-281160 A 10/2001
JP 2006259153 A * 9/2006
(Continued)

OTHER PUBLICATIONS

U.S. Appl. No. 14/529,297, filed Oct. 31, 2014, Isomura, et al.
(Continued)

*Primary Examiner* — Christopher S Kelley
*Assistant Examiner* — Kathleen Walsh
(74) *Attorney, Agent, or Firm* — Oblon, McClelland, Maier & Neustadt, L.L.P.

(57) ABSTRACT

A mask has an inspection region virtually divided by a plurality of stripes. A position error-correcting unit is disposed on a stage in a region different from the mask, formed with patterns divided virtually by the plurality of stripes. A first deviation amount acquiring circuit acquires a first deviation amount from the optical image and the reference image of the position error correction unit. A second deviation amount acquiring circuit acquires a second deviation amount. A position correcting circuit corrects a positional relationship between the mask and the position error correction unit based on the first deviation amount, and obtains a fluctuation value of position coordinates of each pattern in the inspection region of the mask based on the second deviation amount and corrects the position coordinates.

5 Claims, 18 Drawing Sheets

(56) References Cited

U.S. PATENT DOCUMENTS

| | | | | |
|---|---|---|---|---|
| 4,769,523 | A * | 9/1988 | Tanimoto et al. | 219/121.6 |
| 4,799,175 | A * | 1/1989 | Sano | G01R 31/2805 348/126 |
| 5,050,111 | A * | 9/1991 | Ayata | G03F 7/70058 348/87 |
| 5,243,195 | A * | 9/1993 | Nishi | 250/548 |
| 5,917,332 | A * | 6/1999 | Chen et al. | 324/750.02 |
| 6,087,673 | A * | 7/2000 | Shishido | G01N 21/95607 250/208.1 |
| 6,151,102 | A * | 11/2000 | Nishi | 355/53 |
| 6,151,122 | A * | 11/2000 | Taniguchi et al. | 356/399 |
| 6,610,448 | B2 | 8/2003 | Sato et al. | 430/5 |
| 6,686,107 | B2 | 2/2004 | Matsumoto et al. | 430/22 |
| 6,714,691 | B2 * | 3/2004 | Outsuka | 382/294 |
| 6,788,393 | B2 * | 9/2004 | Inoue | G03F 7/70691 355/53 |
| 6,850,327 | B2 * | 2/2005 | Taniguchi | G03F 7/70358 356/399 |
| 6,883,160 | B2 * | 4/2005 | Tsuchiya et al. | 702/82 |
| 6,884,552 | B2 * | 4/2005 | Mieher | G06F 7/0095 356/401 |
| 6,898,306 | B1 * | 5/2005 | Lu | G06T 7/0024 382/151 |
| 6,927,854 | B2 * | 8/2005 | Hirabayashi et al. | 356/401 |
| 7,170,603 | B2 * | 1/2007 | Katayama | 356/399 |
| 7,209,584 | B2 * | 4/2007 | Tsuchiya et al. | 382/145 |
| 7,266,232 | B2 * | 9/2007 | Asai | G06K 9/4647 348/128 |
| 7,349,575 | B2 * | 3/2008 | Hattori et al. | 382/184 |
| 7,359,546 | B2 * | 4/2008 | Sugihara et al. | 382/145 |
| 7,382,914 | B2 * | 6/2008 | Obi | H04N 7/18 250/491.1 |
| 7,521,679 | B2 * | 4/2009 | Nishiyama | H01J 37/026 250/306 |
| 7,526,119 | B2 * | 4/2009 | Isomura et al. | 382/148 |
| 7,564,534 | B2 * | 7/2009 | Den Boef | G03B 27/32 355/53 |
| 7,590,277 | B2 * | 9/2009 | Oaki et al. | 382/141 |
| 7,630,535 | B2 * | 12/2009 | Isomura | 382/144 |
| 7,639,863 | B2 * | 12/2009 | Isomura | 382/144 |
| 7,655,904 | B2 * | 2/2010 | Yamashita | G01N 21/95607 250/306 |
| 7,664,308 | B2 * | 2/2010 | Isomura | 382/144 |
| 7,783,102 | B2 * | 8/2010 | Kawaragi | G01N 21/956 382/145 |
| 7,783,104 | B2 * | 8/2010 | Kawaragi | B81C 99/005 382/149 |
| 7,894,660 | B2 * | 2/2011 | Fujimoto | G03F 9/7076 382/151 |
| 7,995,833 | B2 * | 8/2011 | Konno et al. | 382/151 |
| 8,159,650 | B2 * | 4/2012 | Okita et al. | 355/53 |
| 8,196,543 | B2 * | 6/2012 | Nakajima | B41J 3/28 118/300 |
| 8,213,703 | B2 * | 7/2012 | Inoue et al. | 382/144 |
| 8,254,663 | B2 * | 8/2012 | Kataoka et al. | 382/144 |
| 8,314,920 | B2 * | 11/2012 | Park | G03B 27/32 355/53 |
| 8,411,271 | B2 * | 4/2013 | Shibazaki | 356/401 |
| 8,442,320 | B2 * | 5/2013 | Isomura et al. | 382/181 |
| 8,548,223 | B2 * | 10/2013 | Inoue et al. | 382/145 |
| 8,653,846 | B2 * | 2/2014 | Kogure | H01L 21/6835 174/250 |
| 8,845,317 | B2 * | 9/2014 | Suehira | B82Y 10/00 264/316 |
| 8,861,832 | B2 * | 10/2014 | Inoue et al. | 382/144 |
| 8,903,158 | B2 * | 12/2014 | Tsuchiya et al. | 382/149 |
| 2003/0061594 | A1 * | 3/2003 | Tsuchiya | G03F 1/26 702/82 |
| 2006/0018530 | A1 * | 1/2006 | Oaki et al. | 382/144 |
| 2006/0110069 | A1 * | 5/2006 | Tong | G06T 7/0004 382/294 |
| 2007/0053582 | A1 * | 3/2007 | Yamashita | 382/151 |
| 2007/0071307 | A1 * | 3/2007 | Isomura | G06T 7/001 382/149 |
| 2008/0036899 | A1 * | 2/2008 | Yamashita | G01N 21/95607 348/340 |
| 2008/0037860 | A1 * | 2/2008 | Yamashita | G06K 9/32 382/149 |
| 2008/0095407 | A1 * | 4/2008 | Stewart | G06K 9/3216 382/106 |
| 2008/0239277 | A1 * | 10/2008 | Cramer | G03F 7/70425 355/77 |
| 2008/0260234 | A1 * | 10/2008 | Yamashita | G01N 21/95607 382/144 |
| 2008/0292176 | A1 * | 11/2008 | Sakai | G06T 7/001 382/144 |
| 2008/0292177 | A1 * | 11/2008 | Sheets | G03F 9/7084 382/151 |
| 2009/0284591 | A1 * | 11/2009 | Tsuchiya et al. | 348/92 |
| 2009/0296058 | A1 * | 12/2009 | Slotboom | G03F 7/70516 355/53 |
| 2009/0314414 | A1 * | 12/2009 | Verschuuren | B05D 1/28 156/64 |
| 2010/0067778 | A1 * | 3/2010 | Tamamushi | 382/145 |
| 2010/0074511 | A1 * | 3/2010 | Tamamushi | B82Y 10/00 382/141 |
| 2010/0074513 | A1 * | 3/2010 | Tamamushi | 382/144 |
| 2010/0074516 | A1 * | 3/2010 | Kawaragi | G01N 21/956 382/149 |
| 2010/0220183 | A1 * | 9/2010 | Yoro et al. | 348/86 |
| 2011/0044529 | A1 | 2/2011 | Tsuchiya et al. | |
| 2011/0053062 | A1 * | 3/2011 | Shibazaki | 430/30 |
| 2011/0176719 | A1 * | 7/2011 | Inoue et al. | 382/149 |
| 2011/0221886 | A1 * | 9/2011 | Nishiyama et al. | 348/126 |
| 2011/0249244 | A1 * | 10/2011 | Leewis | G03F 7/709 355/27 |
| 2011/0255770 | A1 * | 10/2011 | Touya | G06T 7/001 382/144 |
| 2011/0313561 | A1 * | 12/2011 | Lee | G06T 7/0004 700/166 |
| 2012/0081538 | A1 * | 4/2012 | Ogawa et al. | 348/87 |
| 2012/0140060 | A1 * | 6/2012 | Tsuchiya et al. | 348/126 |
| 2012/0307043 | A1 * | 12/2012 | Akiyama et al. | 348/125 |
| 2013/0044205 | A1 * | 2/2013 | Matsumoto et al. | 348/86 |
| 2013/0148878 | A1 * | 6/2013 | Lin | G06T 7/0028 382/151 |
| 2013/0216120 | A1 * | 8/2013 | Inoue et al. | 382/144 |
| 2013/0250095 | A1 * | 9/2013 | Inoue et al. | 348/94 |

FOREIGN PATENT DOCUMENTS

| | | |
|---|---|---|
| JP | 2008-112178 | 5/2008 |
| JP | 2009168553 A * | 7/2009 |
| JP | 2010-97168 A | 4/2010 |
| JP | 2010286500 A * | 12/2010 |
| JP | 2012-032506 | 2/2012 |

OTHER PUBLICATIONS

U.S. Appl. No. 14/529,358, filed Oct. 31, 2014, Isomura, et al.
U.S. Appl. No. 13/768,392, filed Feb. 15, 2013, Inoue, et al.
U.S. Appl. No. 14/607,483, filed Jan. 28, 2015, Kikuiri.

* cited by examiner

INSPECTION SYSTEM AND METHOD

CROSS-REFERENCE TO THE RELATED APPLICATION

The entire disclosure of the Japanese Patent Application No. 2012-066065, filed on Mar. 22, 2012 including specification, claims, drawings, and summary, on which the Convention priority of the present application is based, are incorporated herein in its entirety.

FIELD OF THE INVENTION

The present invention relates to an inspection system and inspection method used to detect defects of a pattern formed on an object to be inspected, such as a mask.

BACKGROUND

In recent years, as the levels of integration and capacity of large scale integrated circuits (LSIs) have increased, there has been a need to continue to reduce the width of the circuit patterns of semiconductor devices. Semiconductor devices are manufactured by a reduced projection exposure system called a "stepper" using original artwork patterns with a circuit pattern formed thereon, these are called masks or reticles (hereinafter referred to collectively as masks). Here, a wavelength of deep ultraviolet rays used for the transfer of a pattern is 193 nm, but the size of a pattern to be transferred is shorter than the wavelength. Therefore, the complexity of the lithography technique is also accelerated. Further, the degree of freedom to perform a design change to a different mask pattern for each product is also demanded for mass production of LSIs. In view of these circumstances, an electron beam lithography technique implemented in an electron beam writing system is used when original artwork patterns are formed on a mask.

Electron beam lithography inherently provides a superior resolution, since it uses electron beams, which are a type of charged particle beam. This technology is also advantageous in that great depth of focus is obtained, which enables dimensional variations to be reduced even when a large step feature is encountered. Therefore, the electron beam lithography technique is used not only in manufacturing masks but also when patterns are written directly on a wafer. For example, the technology has been applied to the development of state-of-the-art devices typified by DRAM (dynamic random access memory), as well as to the production of some ASICs.

Incidentally, since the cost to manufacture LSIs is very high, an increase in yield is required to make the manufacturing economically feasible. Therefore, various measures have been adopted in order to increase the yield. In particular, since pattern defects of masks are a large factor in causing yield reduction, the pattern detects are required to be detected accurately in the mask manufacturing process.

However, the dimensions of the patterns for LSI devices, as typified by 1-gigabit class DRAMs are about to be scaled down from the order of submicrons to the order of nanometers. Therefore, the size of pattern defects to be detected on the mask is very small. As a result, high inspection accuracy is required of inspection systems for detecting defects of masks used in LSI manufacture.

There are two known mask defect detecting methods: the die-to-die inspection method and the die-to-database inspection method. Both the inspections are configured so as to compare an optical image of a sample to be inspected with a reference image serving as an example to detect a defect. For example, in the die-to-database inspection, write data (design pattern data) is inputted into an inspection system and design image data (reference image) serving as the reference image is generated based upon the write data. Measurement data (optical image) obtained by photographing a pattern is compared with the design image data (reference image). Incidentally, the write data is obtained by converting CAD (Computer Aided Design) data that has been pattern-designed into a format, which can be inputted into the inspection system.

The die-to-database inspection method is specifically disclosed in Japanese Laid-Open Patent Publication No. 2008-112178. In this document light is emitted from a light source, and the mask to be inspected is irradiated with this light through an optical unit. The mask is mounted on a stage, and this stage is moved so that the emitted beam of light scans the surface of the mask. Light transmitted through or reflected from the mask reaches an image sensor forming an image thereon. The optical image thus formed on the image sensor is sent to a comparing unit as measurement data. The comparing unit compares the measurement data with design image data in accordance with an appropriate algorithm, and if they are not identical, the mask is determined to have a defect.

As described above, according to the decrease in dimensions of a pattern on a mask, a size of a defect to be detected becomes smaller. Therefore, the inspection system is required to have an optical unit with a high magnification, and the time for inspection becomes protracted. Therefore, due to thermal drift of a mask or fluctuation of air flow inside the inspection system caused by long-time irradiation of an inspection light to the mask, measurement errors of a position measuring system caused by various heat sources in the inspection system and the like, there is a problem in that fluctuation of the position of the pattern obtained from the inspection result occurs. In view of further advancement of decreases in pattern dimensions, such a position fluctuation must be corrected.

The present invention has been conceived in view of the above problem. Therefore, an object of the invention is to provide a system and method, which can reduce position errors occurring in the inspection process.

Other challenges and advantages of the present invention are apparent from the following description.

SUMMARY OF THE INVENTION

According to one embodiment of the present invention, an inspection system comprising; a stage on which a sample to be inspected having an inspection region virtually divided by a plurality of stripes is placed, a position error-correcting unit which is disposed on the stage in a region different from the region for placing the sample to be inspected formed with patterns divided virtually corresponding to the plurality of stripes, an optical image acquiring unit which irradiates light onto an inspection region of the sample to be inspected and onto the position error-correcting unit thereby obtaining optical images of the sample to be inspected and of the position error-correcting unit, a reference image generating unit which generates reference images corresponding to the optical images obtained from the sample to be inspected and the position error-correcting unit a comparing unit which compares the optical image of the sample to be inspected and the reference image of the sample to be inspected with each other, and makes a defect judgment when a difference value between both the optical image and the reference image exceeds a predetermined threshold a first deviation amount acquisition part acquiring a first deviation amount from at least the optical image of the position error correction unit, the first deviation amount representing a relative positional deviation between the sample to be inspected and the position error correction unit, a second deviation amount acquisition part acquiring a second deviation amount representing a positional deviation with respect to a true value of positional coordinates of the pattern formed in the position error correction unit, and a position correction part correcting a positional relationship between the sample to be inspected and the position error correction unit based on the first deviation amount, and obtaining a fluctuation value of positional coordinates of each pattern in the inspection region of the sample to be inspected based on the second deviation amount and correcting the positional coordinates.

According to another aspect of this embodiment of the present invention, an inspection system wherein the position error correction unit is provided with an alignment mark, and the first deviation amount acquisition part holds a true value of positional coordinates of the alignment mark, and acquires the first deviation amount from a difference between the true value and an actually-measured value of positional coordinates of the alignment mark obtained from the optical image and the reference image of the position error correction unit.

According to another aspect of this embodiment of the present invention, an inspection system wherein the first deviation amount acquisition part overlaps an optical image of a stripe extracted from the plurality of stripes in the position error correction unit with a reference image corresponding to the optical image of a stripe, thereby acquiring the first deviation amount.

According to another embodiment of this invention, an inspection method comprising the steps of; placing a sample to be inspected on a stage on which a position error correction unit having an alignment mark and a predetermined pattern is disposed, virtually dividing an inspection region of the sample to be inspected by a plurality of stripes and virtually dividing the patterns of the position error-correcting unit by a corresponding plurality of stripes, and moving the stage such that all the stripes are continuously scanned of both the sample to be inspected and the position error-correcting unit to acquire optical images of the sample to be inspected, the position error-correcting unit, and the alignment mark, generating reference images corresponding to the optical images obtained from the sample to be inspected and the position error-correcting unit, comparing the optical image with the reference image of the sample to be inspected with each other, and making a defect judgment when a difference value between both the optical image and the reference image exceeds a predetermined threshold, acquiring a first deviation amount from at least the optical image of the position error correction unit, the first deviation amount representing a relative positional deviation between the sample to be inspected and the position error correction unit, acquiring a second deviation amount representing a positional deviation with respect to a true value of positional coordinates of the pattern formed in the position error correction unit, and correcting a positional relationship between the sample to be inspected and the position error correction unit based on the first deviation amount, and obtaining a fluctuation value of positional coordinates of each pattern in the inspection region of the sample to be inspected based on the second deviation amount and correcting the positional coordinates.

According to another aspect of this embodiment, an inspection method wherein the step of acquiring the second deviation amount comprising the steps of; obtaining an average value of true values of the patterns contained in a predetermined region from the true values of positional coordinates of the patterns formed in the position error correction unit, obtaining actually-measured values of positional coordinates of the patterns formed in the position error correction unit from the optical image and the reference image of the position error correction unit, and obtaining an average value of the actually-measured values of the patterns contained in the predetermined region, and acquiring the second deviation amount from a difference between the average value of the true values and the average value of the actually-measured values.

DETAILED DESCRIPTION OF THE EMBODIMENTS

Embodiment 1

An inspection system according to the present embodiment, includes a stage on which a sample to be inspected is placed. A position error-correcting unit, on which the predetermined pattern is formed, is provided on the stage. This predetermined pattern may be comprised of all colors except white. This exception is the same throughout this specification.

An inspection region of the sample is virtually divided by a plurality of stripes, and the pattern of the position error-correcting unit is also virtually divided by these stripes. The position error-correcting unit can detect the position errors of the patterns occurring in the inspection process. The inspection system and method according to the present embodiment will be described in further detail below.

In the present embodiment, the sample to be inspected is a mask, however it is not limited to this.

The stage according to the present embodiment is a XYθ stage provided to be movable in two horizontal directions by X- and Y-axis motors and rotatable in a horizontal plane by a θ-axis motor. The mask is mounted at a predetermined position on the XYθ stage.

When the inspection is performed, the pattern formed on the mask is irradiated with light emitted from the light source disposed above the XYθ stage. The light transmitted through the mask reaches the photodiode array, thereby forming an optical image thereon. The pattern image formed on the photodiode array is photoelectrically converted by the photodiode array, and then A/D (analog to digital) converted by the sensor circuit into a optical image. Next, the optical image is output to the comparing circuit.

Figure 1:
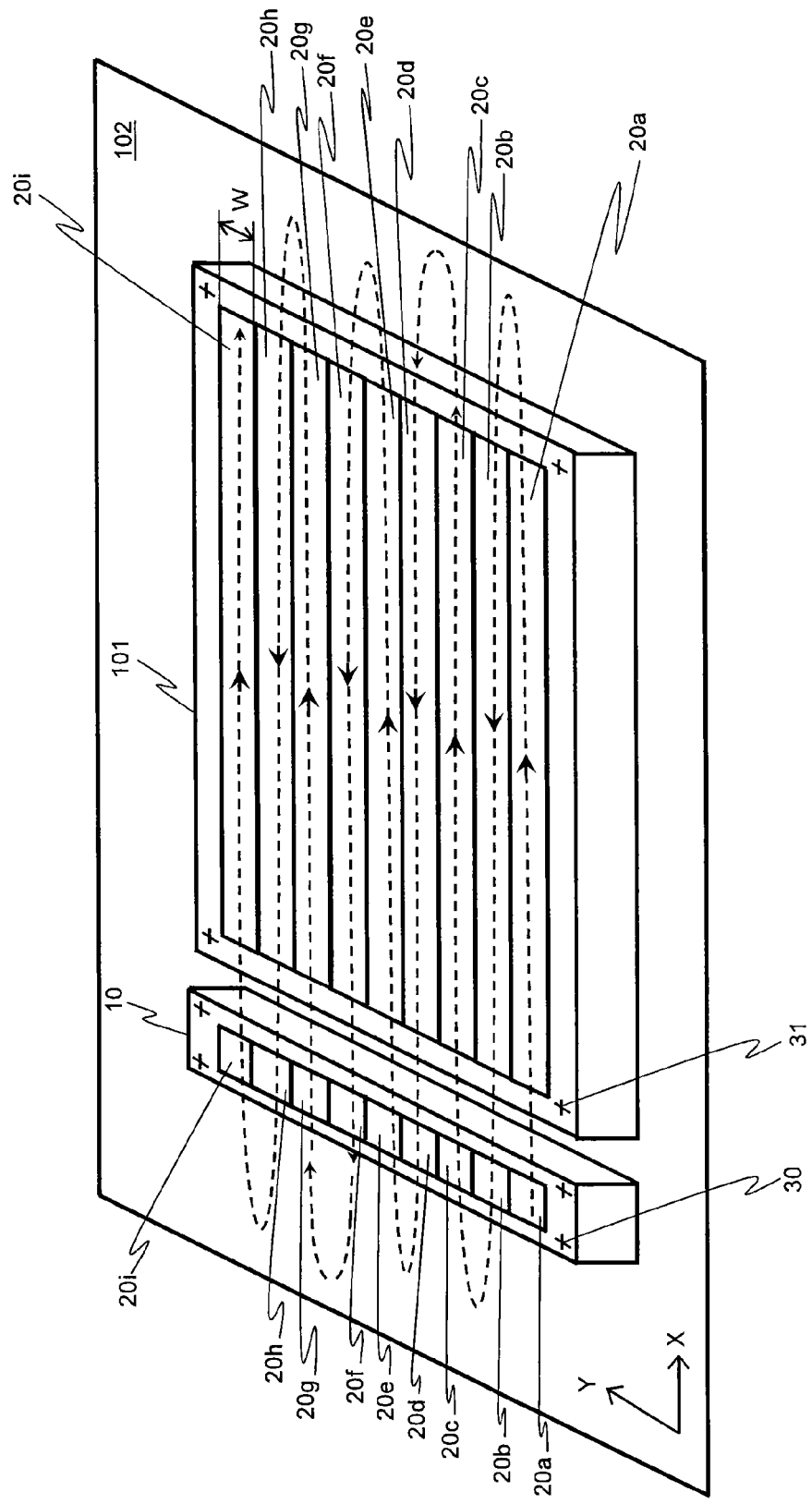
FIG. 1 is a diagram illustrating the process in which an optical image is acquired according to embodiment 1.

FIG. 1 is a diagram illustrating the process in which an optical image is acquired. As shown in FIG. 1, a sample to be inspected, in this case a mask 101 is mounted on the stage 102. An alignment mark 31 is formed on the mask 101. The mask 101 is positioned using the alignment mark 31 at a predetermined position on the stage 102.

The inspection area on the mask 101 is virtually divided into a plurality of strip-shaped stripes by lines running along the X direction, where the width of each stripe in the Y direction is equal to the scan width W. The inspection area is divided into nine stripes corresponding to the first stripe 20a, to the ninth stripe 20i as shown in FIG. 1. The movement of the stage 102 is controlled so that each stripe is continuously scanned. Thereby an image (of each inspection stripe 20) having a width corresponding to the scan width W is continuously input to the photodiode array, and then the optical image is generated.

Specifically, an image of the first stripe 20a is inputted into the photodiode array while the stage 102 is moving in the –X direction. Next, while the stage 102 is moving in the X direction, an image with a scan width W regarding the second stripe 20b is similarly inputted into the photodiode array continuously. Regarding the third stripe 20c, an image is inputted into the photodiode array while the stage 102 is moving in a direction opposite to the direction (X direction) acquiring the image of the second stripe 20b, namely, in the direction (–X direction) acquiring the image of the first stripe 20a. In the subsequent steps, images of all the stripes are similarly inputted in the photodiode array. The images are sequentially input into the photodiode array in this manner, so that efficient acquirement of the optical image is possible.

In this embodiment, a position error-correcting unit 10 is provided on the stage 102. A pattern is formed on a surface of the position error-correcting unit 10. The pattern may be, for example, a pattern composed of a plurality of cross-shaped patterns, a pattern composed of a plurality of line patterns, a pattern composed of a plurality of contact holes, or the like. In addition to the patterns described above, an alignment mark, which is used to correct the relative positional relationship between the mask 101 and the position error-correcting unit 10, is formed on the position error-correcting unit 10.

Positions of respective patterns in relation to the alignment mark on the position error-correcting unit 10, namely, X coordinates and Y coordinates, can be known in a measuring step other than an inspecting step on the mask 101. The measuring step is not affected by fluctuation of heat or airflow, which may occur at the inspecting step. In this embodiment, a position coordinate of the alignment mark obtained by such a measuring step is called the "true value of a position coordinate of the alignment mark in a position error-correcting unit". A position coordinate of patterns is called the "true value of a pattern position coordinate in a position error-correcting unit". Incidentally, for measurement of the true value, a coordinate measuring system such as Model "LMS-IPRO" manufactured by LEICA CAMERA AG, or the like can be used. The number of times of measurement of the true value to be performed may be one in principle, and it is unnecessary to perform the measurement for each inspection.

During the inspecting step, described above, fluctuation occurs in positions of the patterns obtained from the inspection result due to thermal drift caused by long-time irradiation of inspecting light, fluctuation of air flow inside the inspection system, measurement error of a length-measuring system due to various heat sources in the inspection system, and the like. In this embodiment, therefore, the positions of the patterns on the position error-correcting unit 10 together with the positions of the patterns of the mask 101 are measured and the positions of the patterns on the position error-correcting unit are compared with the above true values at the inspecting step. Since differences between the true values and the measured values are positional fluctuations occurring at the inspecting step, it possible to obtain correct positions of respective patterns by correcting the pattern positions of the mask 101 using such values of positional fluctuation (hereinafter referred to as fluctuation values).

The position error-correcting unit 10 is fixed on the stage 102. On the other hand, the mask 101 is placed on the stage 102 when the inspection is performed, and removed from the stage 102 when the inspection is completed. Then, another mask 101, which is the next sample to be inspected, is placed on the stage 102.

The position of the mask 101 placed on the stage 102 is not the same in a strict sense. That is, a relative positional relationship between the mask 101 and the position error-correcting unit 10 changes every time a mask 101 is placed on the stage. Therefore, in order to obtain an exact position of the pattern written on the mask 101, it is preferred that the relative positional relationship with the position error-correcting unit 10 is corrected.

A method for obtaining the pattern position on the mask 101 will be described below. Incidentally, the calculation of the pattern position can be performed in conjunction with the inspection process of the mask 101.

Firstly, the mask 101 is positioned on the stage 102 as shown in FIG. 1. The mask 101 is provided with alignment marks 31, and these alignment marks 31 are used to adjust the position of the stage 102 so that the mask 101 is located at a desired position. At this time, by moving the stage 102, the position error-correcting unit 10 is also moved in conjunction with the stage 102. The mask 101 and the position error-correcting unit 10 generally deviate from an ideal positional relationship with each other, that is, it is rare that both the mask 101 and the position error-correcting unit 10 are in ideal positions, so that, if the stage 102 is moved such that the mask 101 is located at a desired position, the position error-correcting unit 10 is located at a position deviated from a desired position. More specifically, the position error-correcting unit 10 is located at a position deviated from an ideal position with respect to the respective X direction, Y direction, and θ direction.

Next, as illustrated in FIG. 1, the optical image of the inspection region on the mask 101 is acquired. Here, the pattern provided in the position error-correcting unit 10 is virtually divided into the same stripes as stripes dividing the inspection region on the mask 101, namely, nine stripes from the first stripe 20a to the ninth stripe 20i. Thereby, the images of the divided patterns of the position error-correcting unit 10 are inputted into the photodiode array, continuously inputting the images of the inspection region into the photodiode array.

Specifically, in FIG. 1, when the stage 102 is moved, the respective images on the first stripe 20*a*, the second stripe 20*b*, the third stripe 20*c*, etc, until the ninth stripe 20*i* dividing the inspection region of the mask 101 are acquired, the movement of the stage also includes the area where the alignment mark 30 and the pattern of the position error-correcting unit 10 are located. By including not only the inspection region of the mask 101 but also an area where the alignment mark 30 and the pattern of the position error-correcting unit 10 within a movement range of the stage 102 in the X direction, the respective images on the first stripe 20*a*, the second stripe 20*b*, the third stripe 20*c*, etc, until the ninth stripe 20*i* in the position error-correcting unit 10 are also acquired in a series of movements of the stage 102. That is, without causing the stage 102 to move uselessly, the images of the inspection region of the mask 101 and the images of the patterns of the position error-correcting unit 10 can be acquired. The "movement range of the stage 102" defined here, however, does not include a region required until the stage 102 reaches uniform movement, namely, an acceleration region of the stage 102.

As described above, the position error-correcting unit 10 is also provided with alignment marks 30. Therefore, from the images of the position error-correcting unit 10 acquired according to the above method, positional coordinates of the alignment mark 30 are obtained. Specifically, by measuring the moving positions of the stage 102 with a position measuring system, for example a laser position measuring system, (not shown in FIG. 1), exact positions of the respective patterns in the optical image are obtained. Next, a difference between the positional coordinates of the alignment mark obtained and the true value of positional coordinates of the alignment mark obtained in advance is acquired. This difference becomes a deviation amount from the ideal position of the position error-correcting unit 10, in other words, a relative positional deviation amount between the position error-correcting unit 10 and the mask 10.

In addition, from the images of the patterns of the position error-correcting unit 10, positional coordinates of the respective patterns can also be obtained. By obtaining differences between the positional coordinates obtained and the true values of positional coordinates obtained in advance, fluctuation values of positional coordinates of the patterns occurring in the inspection process can be acquired.

From the values obtained in the above manner, the exact positions of the patterns on the mask 101 are obtained. That is, with use of the differences between the positional coordinates of the alignment mark 30 obtained from the optical image of the position error-correcting unit 10 and the true values of positional coordinates of the alignment mark 30 obtained in advance, the relative positional relationship between the position error-correcting unit 10 and the mask 101 is corrected. Next, with use of the differences between the positional coordinates of the respective patterns of the position error-correcting unit 10 and the true values of positional coordinates of the corresponding respective patterns, the positions of the respective patterns on the mask 101 are corrected. Thereby the exact positions of the respective patterns on the mask 101 can be located.

Incidentally, such a configuration may be adopted that the relative positional relationship between the position error-correcting unit 10 and the mask 101 is corrected after the positions of the respective patterns on the mask 101 are corrected with use of the differences between the positional coordinates of the respective patterns of the position error-correcting unit 10 and the true values of positional coordinates of the corresponding respective patterns.

Next, by citing a specific example, a method of obtaining the pattern positions on the mask 101 will be described in further detail.

<Acquisition of True Values of Positional Coordinates>

The position error-correcting unit 10 is provided with four alignment marks 30. That is, as shown in FIG. 1, the respective alignment marks 30 are provided at four corners of a surface of the position error-correcting unit 10. The respective positional coordinates of these alignment marks 30 are obtained by means of Model LMS-IPRO manufactured by Leica or the like. Incidentally, the shapes, number, and positions of the alignment marks 30 are not limited to those in the example in FIG. 1.

In addition, the position error-correcting unit 10 is provided with a plurality of line patterns (not shown in FIG. 1). A true value of positional coordinates of one of the line patterns is obtained. Similarly, true values of positional coordinates of the other line patterns are obtained. Then, an average value (an average value of the true values) of positional coordinates of the line patterns contained in a predetermined region is obtained. Here, the predetermined region can be set to, for example, a region having a size of 2 mm×2 mm. Incidentally, one stripe is composed of a collection of a predetermined number of such predetermined regions. This, however, is not a limitation, and as an example, the predetermined region may be larger than the width of the stripe.

Incidentally, in order to obtain the average value, it is possible to rearrange the values of positional coordinates and remove upper and lower extreme values. Thereby, it is made possible to obtain a more exact average value. For example, an average value can be calculated with the exclusion of the top and bottom 20% in total, that is, the top 10% data and the bottom 10% data.

In addition, on the position error-correcting unit 10, patterns having the same shape may be arranged in the same direction and at the same intervals, or patterns having different shapes may be arranged in different directions and at different intervals. In the latter case, there is the advantage that, from the shapes, directions, and intervals of the patterns, the positions can be located, so that alignment using the patterns becomes possible.

Figure 16:
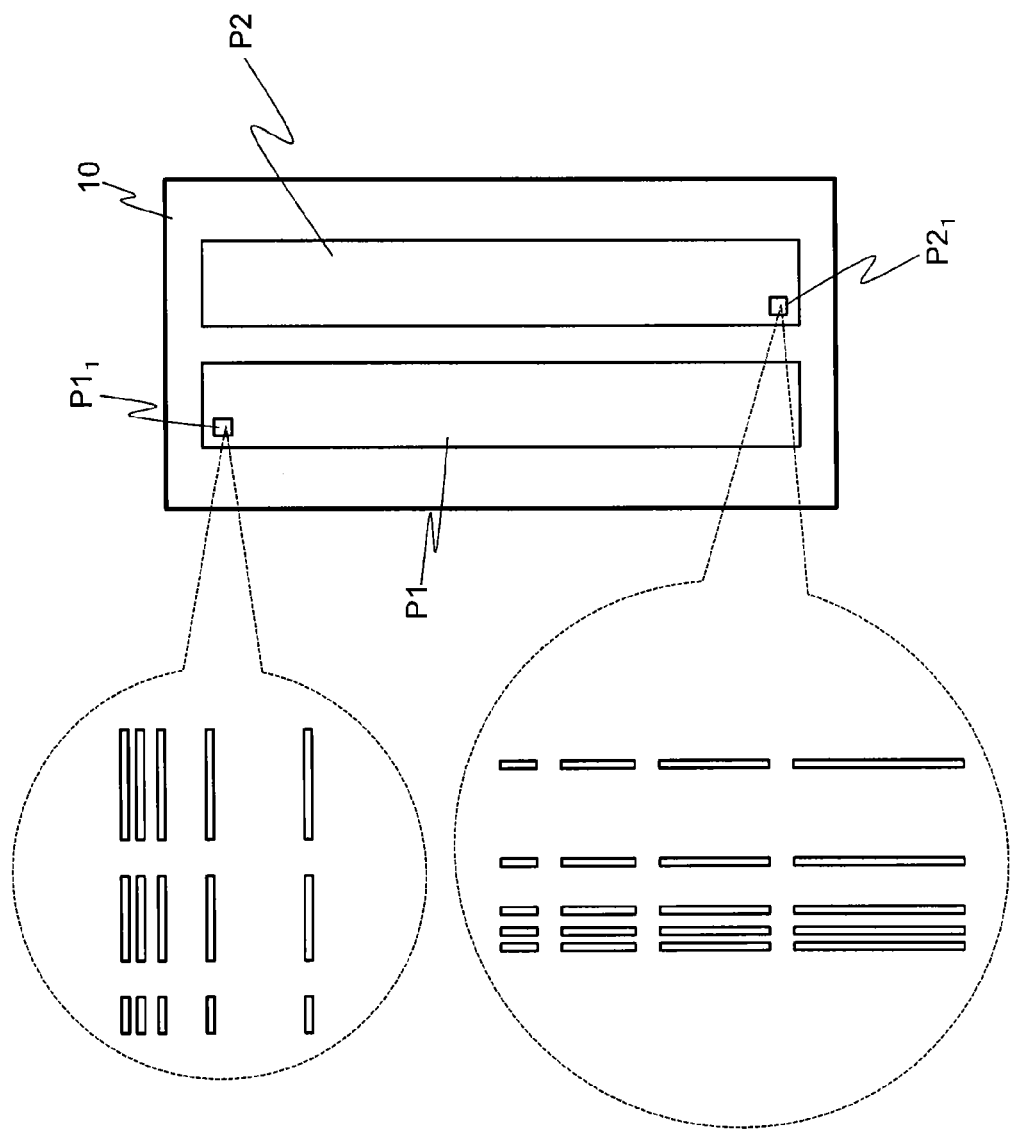
FIG. 16 is an example of a pattern of a position error-correcting unit according to embodiment 1.

FIG. 16 is an example of patterns provided on the position error-correcting unit 10. In a region P1, a plurality of line patterns is formed. A region P1$_1$ is a part of the region P1, and, as illustrated in an enlarged view in FIG. 16, the region P1 is composed of a plurality of lines having different lengths and arranged at different intervals. In addition, a plurality of line patterns is formed in a region P2. A region P2$_1$ is a part of the region P2, and, as illustrated in an enlarged view in FIG. 16, the region P2 is composed of a plurality of lines having different lengths and arranged at different intervals. Incidentally, the direction of the patterns that the region P1 is composed of and the direction of the patterns that the region P2 is composed of are different from each other by 90 degrees.

Such patterns as shown in FIG. 16 make it possible to locate the respective lines pattern from the lengths, directions, and intervals of the lines. Therefore, these patterns make alignment of the position error-correcting unit 10 possible, so that the alignment of the position error-correcting unit 10 can be facilitated when the patterns are used in conjunction with the alignment marks 30.

<Acquisition of Optical Image>

Next, as shown in FIG. 1, the inspection region on the mask 101 is virtually divided toward the Y direction by nine stripes from the first stripe 20*a* to the ninth stripe 20*i*. Similarly, the pattern on the position error-correcting unit 10 is also virtually divided by the same stripes, that is, by the stripes from the first stripe 20a to the ninth stripe 20i. Regarding both the inspection region on the mask 101 and the position error-correcting unit 10, the stage 102 is moved such that all the stripes are continuously scanned.

For example, in FIG. 1, arrows show directions in which images are acquired. Starting from the first stripe 20a in the position error-correcting unit 10, the first stripe 20a on the mask 101 is scanned by moving the stage 102 in the −X direction. Thereby, an image of the first stripe 20a on the mask 101 is acquired following an image of the first stripe 20a of the position error-correcting unit 10. Next, an image of the second stripe 20b on the mask 101 is acquired by moving the stage 102 in the X direction after having moved the stage in the −Y direction in a stepping fashion. Subsequently, an image of the second stripe 20b of the position error-correcting unit 10 is acquired. Thereafter, the respective images of the third stripes 20c, the fourth stripes 20d, through to the ninth stripes 20i regarding both the position error-correcting unit 10 and the mask 101 are acquired according to the directions indicated by the arrows.

<Acquisition of Deviation Amount>

The positional coordinates of the alignment mark provided on the position error-correcting unit 10 are obtained based upon the optical images of the position error-correcting unit 10 acquired during the above step. Then, differences between the positional coordinates of the alignment marks 30 and the true values of positional coordinates of the alignment marks 30 are obtained. Thereby, a deviation amount from the ideal position of the position error-correcting unit 10 (described below, also called a first deviation amount) is obtained, so that the relative positional relationship between the mask 101 and the position error-correcting unit 10 can be corrected.

In addition, based on the above optical images, positional coordinates of the respective line patterns are obtained. Then, an average value of the positional coordinates of the line patterns contained in the same predetermined region as in the case of obtaining the true value (an average value of actually measured values) is calculated. Next, a difference between an "average value of true values" in the predetermined region and an "average value of actually measured values" in the same region as this predetermined region is calculated. Thereby, a fluctuation value of the positional coordinates of the pattern occurring in the inspection process (described below, also called a second deviation amount) can be known.

Then, with use of the first deviation amount, the relative positional relationship between the position error-correcting unit 10 and the mask 101 is corrected, and, in addition, with use of the second deviation amount, the positions of the respective patterns on the mask 101 are corrected. Thereby, the exact positions of the respective patterns on the mask 101 can be known.

Incidentally, instead of adopting the difference between the average values as the second deviation amount, differences between the true values and the actually measured values of the respective patterns can be adopted as the second deviation amount. However, in this case, the data amount to be processed for correcting the position error becomes vast. On the other hand, it is thought that a difference in fluctuation value between adjacent patterns is minute at the inspection time. As described above, therefore, regarding the patterns included in the predetermined region, it is preferred that respective average values of the true values and the actually measured values in the predetermined region are obtained and a differences between the average value of the true values and the average value of the actually measured values is adopted as the fluctuation values.

A phenomenon whereby the positional coordinates of the patterns fluctuate is caused by the fact that the inspection time becomes too long. Therefore, the second deviation amount is not constant, and it becomes larger according to the increase of time elapsing from the start of the inspection. That is, on the mask 101, the fluctuation values of the positional coordinates of the respective patterns become larger from the first stripe 20a to the ninth stripe 20i. That is, the deviation amount of the second stripe 20b will be larger than the deviation amount of the first stripe 20a, the deviation amount of the third stripe 20c will be larger than the deviation amount of the second stripe 20b, etc, increasing through to the ninth stripe 20i. Similarly, the fluctuation values of the positional coordinates of the patterns in the position error-correcting unit 10 also become larger from the first stripe 20a, the second stripe 20b, etc, through to the ninth stripe 20i. Further, even if patterns are included in the same stripe, as compared with the fluctuation value of the coordinate position of a pattern first inspected, the fluctuation value of the coordinate position of a pattern inspected thereafter becomes larger.

Therefore, linear interpolation is performed using the fluctuation values of the positional coordinates (the second deviation amount) obtained from differences between the "average value of true values" and the "average value of actually measured values" in the position error-correcting unit 10. Thereby, the fluctuation values of the positional coordinates of the patterns (the second deviation amount) on the mask 101 can be obtained. The positional deviation amounts of the patterns can be reduced by correcting the actually measured values using these obtained fluctuation values (the second deviation amount). The relative positional relationship between the position error-correcting unit 10 and the mask 101 can be corrected by using the first deviation amount, thereby a more accurate position of the patterns on the mask 101 can be known.

Incidentally, obtaining the fluctuation values of the positional coordinates of the patterns on the mask 101 is not limited to the above-described linear interpolation. For example, interpolation using a high-order function such as a B-spline curve may be adopted.

Further, regarding a predetermined means region in the position error-correcting unit 10, an average value of the fluctuation values of the positional coordinates obtained from the differences between the "average value of true values" and the "average value of actually measured value" is obtained. For example, regarding a region defined by a range of the X coordinate from 0 to 2 and a range of the Y coordinate from 0 to 2, an average value of the fluctuation values of the positional coordinates obtained from the above differences is acquired. Using the average value, all actually measured values contained in a range of the Y coordinate from 0 to 2 in the inspection region on the mask 101 can be corrected.

Incidentally, even when the position error-correcting unit 10 is arranged in a different position, as shown in FIG. 1, the fluctuation values of the positional coordinates of the patterns can be obtained. For example, the position error-correcting unit 10 can be provided on the side opposed to the position of mask 101 shown in FIG. 1.

In this embodiment, however, as shown in FIG. 1, it is preferred that the position error-correcting unit 10 is disposed such that an arrangement direction of the stripes is perpendicular to the moving direction (X direction) of the stage, but it is not preferred that the arrangement direction of the stripes is perpendicular to the Y direction. That is, it is improper to arrange the position error-correcting unit 10 in a direction obtained by rotating the arrangement shown in FIG. 1 by 90°. This is for the following reason.

If the arrangement shown in FIG. 1 is adopted, as described above, both images on the position error-correcting unit 10 and the mask 101 can be acquired according to a series of movements of the stage 102 for scanning the first stripes 20a to the ninth stripes 20i. However, when the position error-correcting unit 10 is arranged in a direction obtained by rotating the position error-correcting unit 10 from the arrangement shown in FIG. 1 by 90°, the fluctuation values of the positional coordinates of the patterns can be obtained, but the patterns on the position error-correcting unit 10 cannot be divided using the same stripes as those of the mask 101, so that both the images cannot be acquired according to the series of movements of the stage 102.

For example, after the first stripe 20a on the position error-correcting unit 10 has been scanned, it is necessary to scan the first stripe on the mask 101 after the stage 102 is moved in the X direction and in the Y direction. Further, it is necessary to change the scanning direction for the mask 101 in this case from the scanning direction for the position error-correcting unit 10. After scanning of the first stripe 20a on the mask 101 has been completed, the second stripe 20b is scanned after returning to the position error-correcting unit 10 again. Even at this time, in addition to the stage 102 moving in the X direction and in the Y direction, the scanning direction for the position error-correcting unit 10 must be changed from the scanning direction for the mask 101. Regarding scans subsequent thereto, it is necessary to change the position and the moving direction of the stage 102 between the case of scanning the mask 101 and the case of scanning the position error-correcting unit 10.

When the arrangement of the position error-correcting unit 10 is such that the arrangement direction of the stripes thereof is perpendicular to the Y direction to acquire both the images on the position error-correcting unit 10 and the mask 101 in this manner, movements of the stage 102 become complicated. This results in a prolonging of the inspection time. Therefore, it is preferred that the position error-correcting unit 10 is arranged such that the arrangement direction of the stripes thereof is perpendicular to the moving direction (X direction) of the stage.

Next, an inspection system according to the present embodiment will be described in detail.

Figure 2:
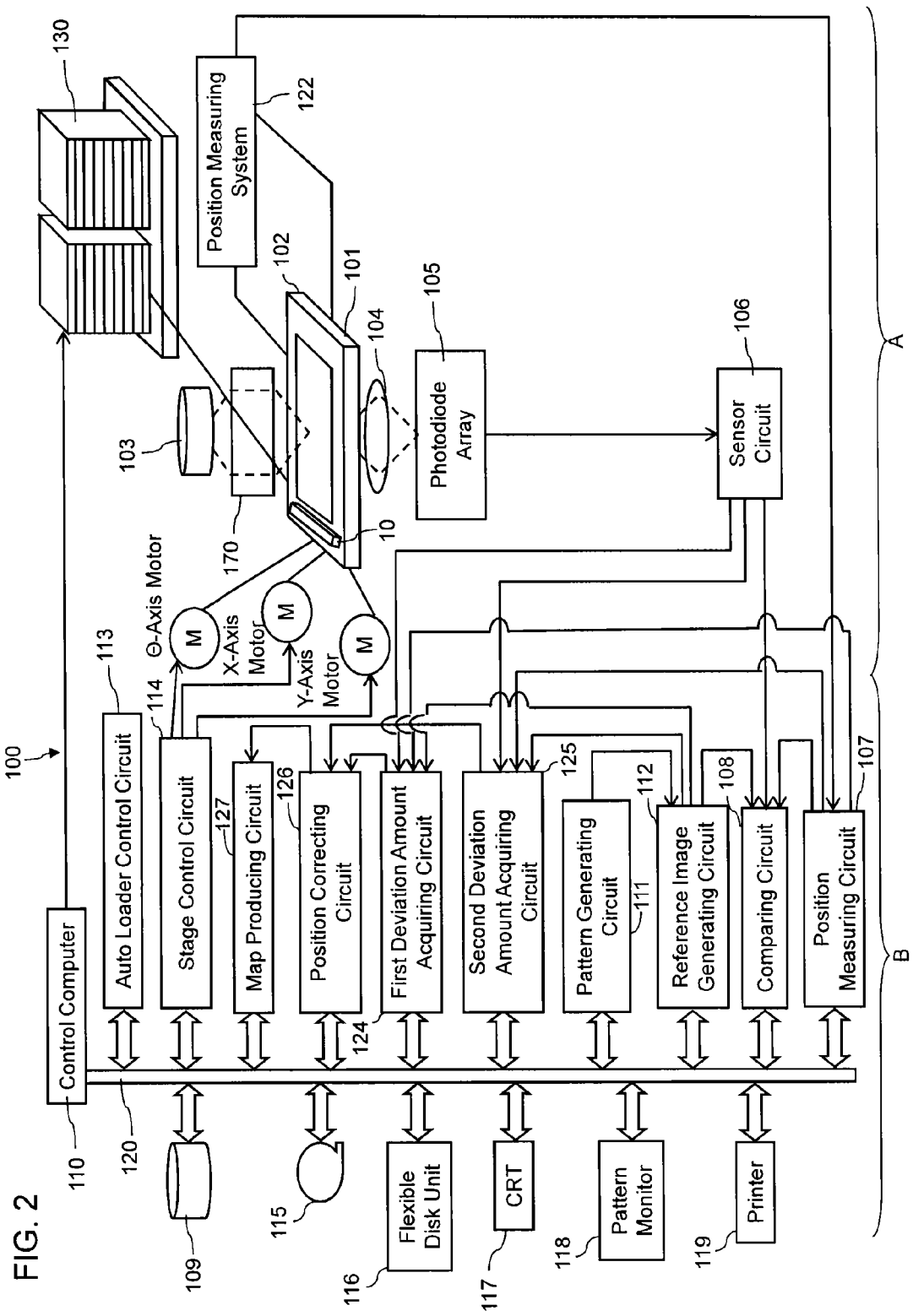
FIG. 2 is a diagram showing the configuration of an inspection system according to embodiment 1.

FIG. 2 is a diagram showing the configuration of an inspection system according to the present embodiment. As shown in FIG. 2, the inspection system 100 includes an optical image acquiring unit A and a control unit B.

The optical image acquiring unit A includes a light source 103, a stage 102 movable in the horizontal X and Y directions and rotatable in a horizontal plane (or in a θ direction), an illumination optical unit 170 serving as a transmission illumination system, an enlarging optical unit 104, a photodiode array 105, a sensor circuit 106, a position measuring system 122, and an auto loader 130. The mask 101 is automatically loaded onto the stage 102 from the auto loader 130 driven by the auto loader control circuit 113, and, upon completion of its inspection, the mask 101 is automatically retrieved from the stage 102.

In the control unit B, a control computer 110 which controls the entire inspection system 100 is connected through a bus 120 (serving as a data transmission path) to a position measuring circuit 107, a comparing circuit 108, a reference image generating circuit 112, a pattern generating circuit 111, a first deviation amount acquiring circuit 124, a second deviation amount acquiring circuit 125, a position correcting circuit 126, a map generating circuit 127 an auto loader control unit 113, a stage control circuit 114, a magnetic disk unit 109 serving as a storage unit, a magnetic tape unit 115, a flexible disk unit 116, a CRT (cathode ray tube) 117, a pattern monitor 118, and a printer 119.

The comparing circuit 108 corresponds to a comparing unit according to the present invention. The first deviation amount acquiring circuit 124 corresponds to a first deviation amount acquiring unit according to the present invention. The second deviation amount acquiring circuit 125 corresponds to a second deviation amount acquiring unit correcting unit according to the present invention. The position correcting circuit 126 corresponds to a position correcting unit according to the present invention. The map generating circuit 127 corresponds to a map generating unit according to the present invention.

X-, Y-, and θ-axis motors controlled by the stage control circuit 114, drive the stage 102. These motors may be, for example, step motors.

The position of the stage 102 is measured by the position measuring system 122, and the measurement data is sent to the position measuring circuit 107. An optical image output from the sensor circuit 106 is sent to the comparing circuit 108, together with data indicative of the position of the mask 101 on the stage 102, the data is data output from the position measuring circuit 107. The optical image is also sent to the first deviation amount acquiring circuit 124 and to the second deviation amount acquiring circuit 125.

Design pattern data, which is used as reference data in die-to-database inspection, is stored in the magnetic disk unit 109. This data is read out and sent to the pattern generating circuit 111, when necessary, in the course of the inspection process. The pattern generating circuit 111 converts the design pattern data into image data (or bit pattern data). This image data is then sent to the reference image generating circuit 112 for the generating of reference data. The reference data generated from the design pattern data is sent to the comparing circuit 108.

It should be noted that the inspection system of the present embodiment may include, in addition to the components shown in FIG. 1 described above, other known components used in the process of inspecting masks; for example, the inspection system may include a review device described later.

Figure 3:
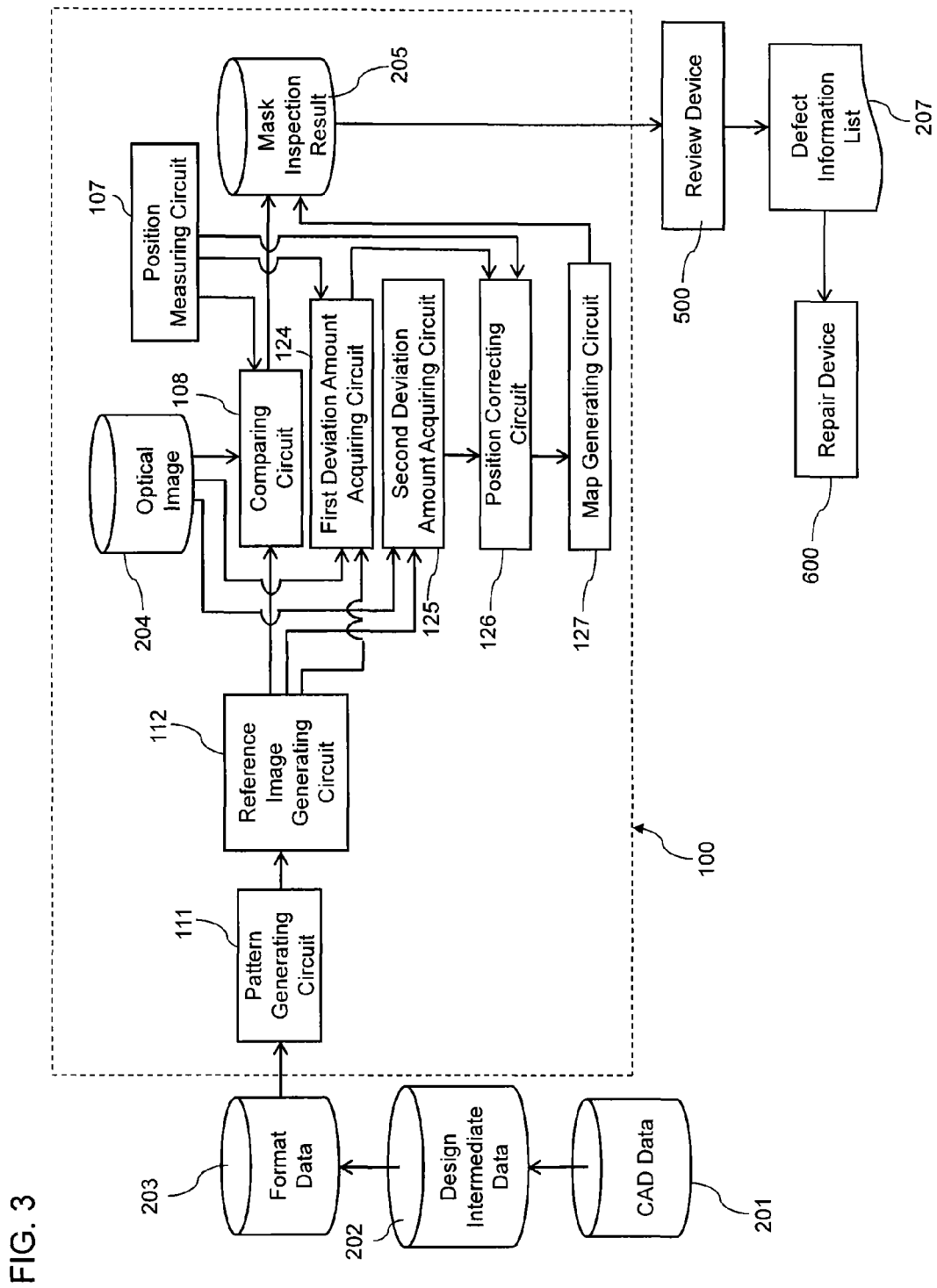
FIG. 3 is a schematic diagram showing a flow of data according to embodiment 1.

FIG. 3 is a schematic diagram showing a flow of data according to the present embodiment.

As shown in FIG. 3, CAD data 201 prepared by the designer (or user) is converted to design intermediate data 202 in a hierarchical format such as OASIS. The design intermediate data 202 includes data of the pattern formed on the mask created for each layer. It should be noted that, generally, inspection systems are not adapted to be able to directly read the design intermediate data 202. That is, each manufacturer of inspection systems uses different format data. Therefore, the design intermediate data 202 is converted, for each layer, to format data 203 in a format specific to the inspection system 100 used, and this format data 203 is input to the inspection system 100. Although the format data 203 may be data specific to the inspection system 100, the format data 203 may also be data compatible with a writing system.

Figure 4:
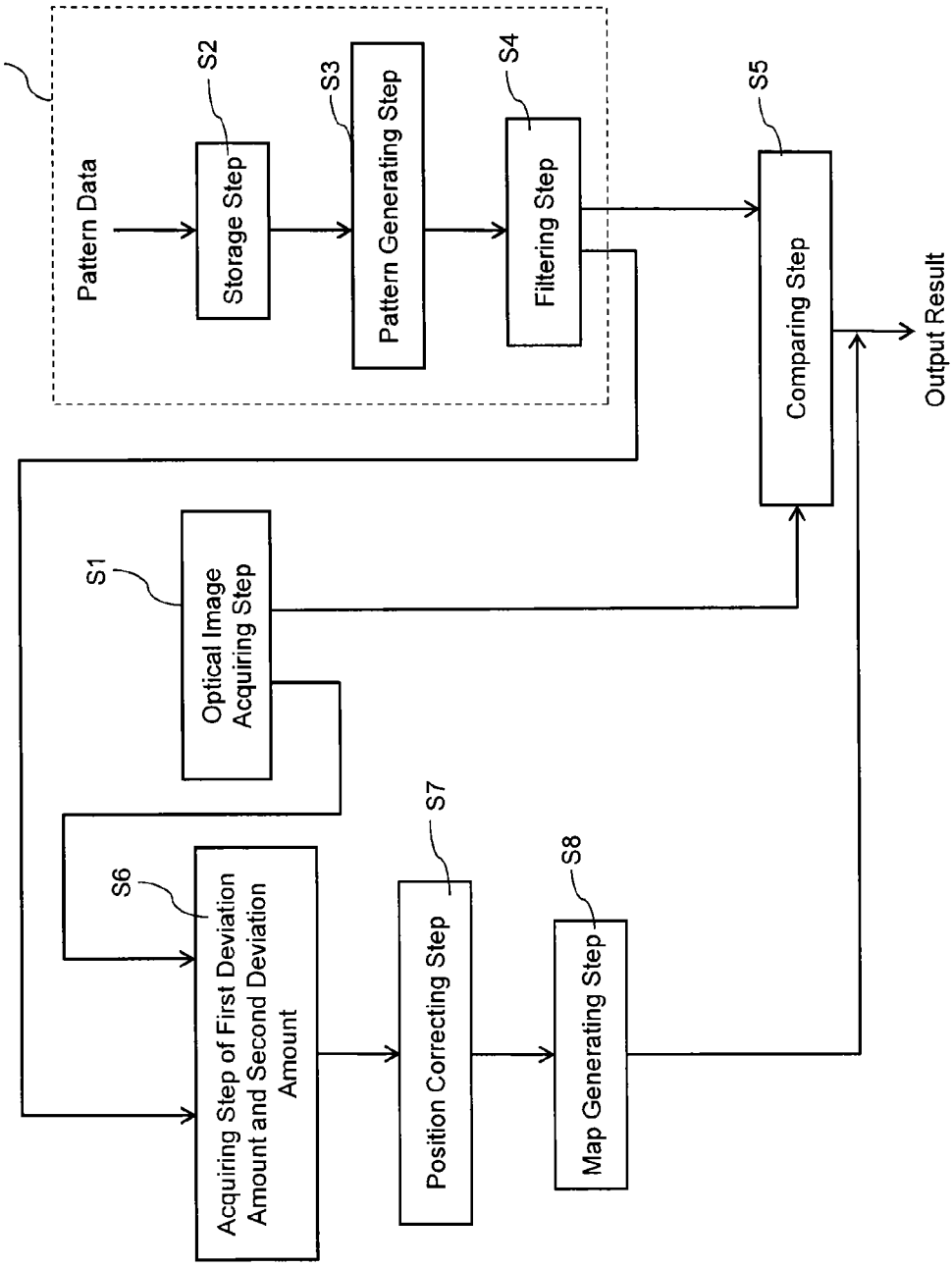
FIG. 4 is a flowchart of an inspection process according to embodiment 1.

FIG. 4 is a flowchart of an inspection process according to the present embodiment. The inspection method adopting the die-to-database method will now be described. A reference image to be compared with an optical image of a sample to be inspected is a reference image generated based upon the write data (design pattern data). Incidentally, the inspection system of the present embodiment can be also applied to the inspection method using the die-to-die method, where the reference image is an optical image different from the sample to be inspected.

As shown in FIG. 4, the inspection process includes an optical image acquiring step (S1), a storage step (S2) for design pattern data constituting reference image acquiring step, a pattern generating step (S3), a filtering step (S4), a comparison step (S5) between an optical image and a reference image, an acquiring step (S6) of a first deviation amount and a second deviation amount, a position correcting step (S7) of a relative positional relationship between the mask 101, the position error-correcting unit 10, and a correction of the positional coordinates of the mask pattern, and a map generating step (S8) of generating a map of position coordinate fluctuation values on an entire mask pattern.

<Optical Image Acquiring Step>

In the optical image acquiring step (S1) as shown in FIG. 4, an optical image acquiring unit A (shown in FIG. 2) acquires an optical image (hereinafter referred to as measurement data) of the mask 101 and an optical image of the position error-correcting unit 10. The optical image of the mask 101 is an image of a mask on which pattern figures are written based on pattern figure data included in the design pattern. The optical image on the position error-correcting unit 10 includes an image of the alignment mark 30 and an image of a pattern figure for forming a pattern serving as a reference for correcting a position error.

The following is one example of a process in which an optical image is acquired.

The sample, in this instance, a mask 101, is mounted on the stage 102. The stage is movable in two horizontal directions using X- and Y-axis motors and rotatable in a horizontal plane using a θ-axis motor. At this time, the alignment mark provided on the mask 101 is used to adjust the position of the stage 102 by means of motors for the respective X, Y, θ axes so that the mask 101 is positioned at a desired position on the stage 102.

The position error-correcting unit 10 is provided on the stage 102. The inspection region of the mask 101 is virtually divided into a plurality of stripes, and the pattern of the position error-correcting unit 10 is also virtually divided by these stripes.

Each pattern formed on the mask 101 and the position error-correcting unit 10 is then irradiated with light emitted from the light source 103 disposed above the stage 102. More specifically, the beam of light emitted from the light source 103 passes through the illumination optical unit 170 and is illuminated on the mask 101 and the position error-correcting unit 10. The enlarging optical unit 104, the photodiode array 105, and the sensor circuit 106 are disposed below the stage 102. The light transmitted through the mask 101 and the position error-correcting unit 10 passes through the enlarging optical unit 104 and reaches the photodiode array 105, thereby forming an optical image thereon.

It should be noted that the enlarging optical unit 104 could have its focus automatically adjusted by an autofocus mechanism (not shown). Further, the position error-correcting unit 10 may be structured so as to be capable of being moved up and down by a spring mechanism or the like. According to this structure, when a mask 101 of different thickness is a sample to be inspected, the height of the mask 101 and the height of the position error-correcting unit 10 can coincide with each other by adjusting the position of the position error-correcting unit 10.

The position error-correcting unit 10 is arranged so that the arrangement direction of the stripes thereof is perpendicular to the moving direction (X direction) of the stage. When the stage 102 moves in the -X direction, images in the first stripes 20a of the mask 101 and the position error-correcting unit 10 are inputted into the photodiode array. Next, when the stage 102 is moved in the X direction, after moving in the -Y direction in a step fashion, images in the second stripes 20b of the mask 101 and the position error-correcting unit 10 are inputted into the photodiode array. Further, when the stage 102 is moved in the -X direction after moving in the -Y direction, images in the third stripes 20c of the mask 101 and the position error-correcting unit 10 are inputted into the photodiode array. In the subsequent steps, images in all the stripes are similarly inputted into the photodiode array.

The pattern image formed on the photodiode array 105 is photoelectrically converted by the photodiode array 105 and A/D (analog to digital) converted by the sensor circuit 106 into an optical image. An image sensor is arranged in the photodiode array 105. As for the image sensor according to the present invention, a line sensor composed of CCD (charge coupled devices) cameras lined up serving as an imaging device is used. The line sensor may be, for example, TDI (Time Delay Integration) sensors. Thus, the pattern on the mask 101 is imaged by these TDI sensors while the stage 102 is continuously moved in the positive or negative X direction. The light source 103, the enlarging optical unit 104, the photodiode array 105, and the sensor circuit 106 together form a high power optical unit inspection.

The stage 102 can be moved in the X and Y directions and rotated in a θ direction (or in an XY plane) by a drive system such as a 3-axis (X-Y-θ) motor driven by the stage control circuit 114 under the control of the control computer 110. These X-, Y-, and θ-axis motors may be, for example, step motors. The position of the stage 102 is measured by the position measuring system 122, and the measurement data is sent to the position measuring circuit 107. The mask 101 is automatically loaded onto the stage 102 from the auto loader 130 driven by the auto loader control circuit 113, and upon completion of the inspection, the mask 101 is automatically retrieved from the stage 102.

The optical image 204, which was acquired in the optical image acquiring step (S1), is sent to the comparing circuit 108, the first deviation amount acquiring circuit 124, and the second deviation amount acquiring circuit 125, as seen in FIG. 2.

<Storage Step>

At the storage step (S2), as seen in FIG. 4, the design pattern data that was used to form the pattern on the mask 101, and the pattern data of the position error-correcting unit 10 are stored in the magnetic disk unit 109 serving as a storage unit (as shown in FIG. 2).

The designed pattern includes pattern figures each consisting of basic pattern figures such as rectangles and triangles. The magnetic disk unit 109 stores feature data indicating the shape, size, and position of each pattern feature, specifically, information such as the coordinates (x, y) of the reference position of each feature, the length of its sides, and a shape code (or identifier) identifying the type of shape, such as a rectangle or triangle. Further, a pattern figure constituting patterns of the position error-correcting unit 10 may have, for example, a cross shape, a line shape or the like.

A group of pattern figures, defined in an area approximately a few tens of Micrometers Square is generally referred to as a "cluster" or "cell". In the storage step, it is common practice that the design pattern data is defined in a hierarchical structure using clusters or cells. A cluster (or cell), which contains a pattern feature or pattern figures, may be used alone or repeated at certain intervals. In the former case the coordinate positions of the cluster (or cell) on the mask are specified, whereas in the latter case the coordinate positions of each copy of the cluster (or cell) are indicated together with a repetition instruction. Each cluster (or cell) is disposed in a strip-shaped region, referred to as a "frame" or "stripe", having a width of a few hundreds of micrometers and a length of approximately 100 mm which corresponds to the length of the mask in the X or Y direction.

<Pattern Generating Step>

At the pattern generating step (S3) in FIG. 4, the pattern generating circuit 111 (shown in FIG. 2) reads design pattern data of the mask 101 from the magnetic disk unit 109 through the control computer 110 and converts it into 2-bit or other multiple-bit image data (bit pattern data). This image data is sent to the reference image generating circuit 112.

Specifically, upon reading the design pattern data, the pattern generating circuit 111 generates data of each pattern feature, and interprets the shape code in the data indicative of the shape of the pattern feature and obtains its dimensions. The pattern generating circuit 111 then divides the pattern into a virtual grid of squares (or grid elements) having predetermined quantization dimensions, and generates 2-bit or other multiple-bit design image data of the design pattern segment in each grid element. By using the generated design image data, the pattern generating circuit 111 calculates the design pattern occupancy in each grid element (corresponding to a sensor pixel). This pattern occupancy in each pixel represents the pixel value.

<Filtering Step>

At the filtering step (S4) in FIG. 4, after receiving the design image data the reference image generating circuit 112 performs appropriate filtering on the data.

Figure 5:
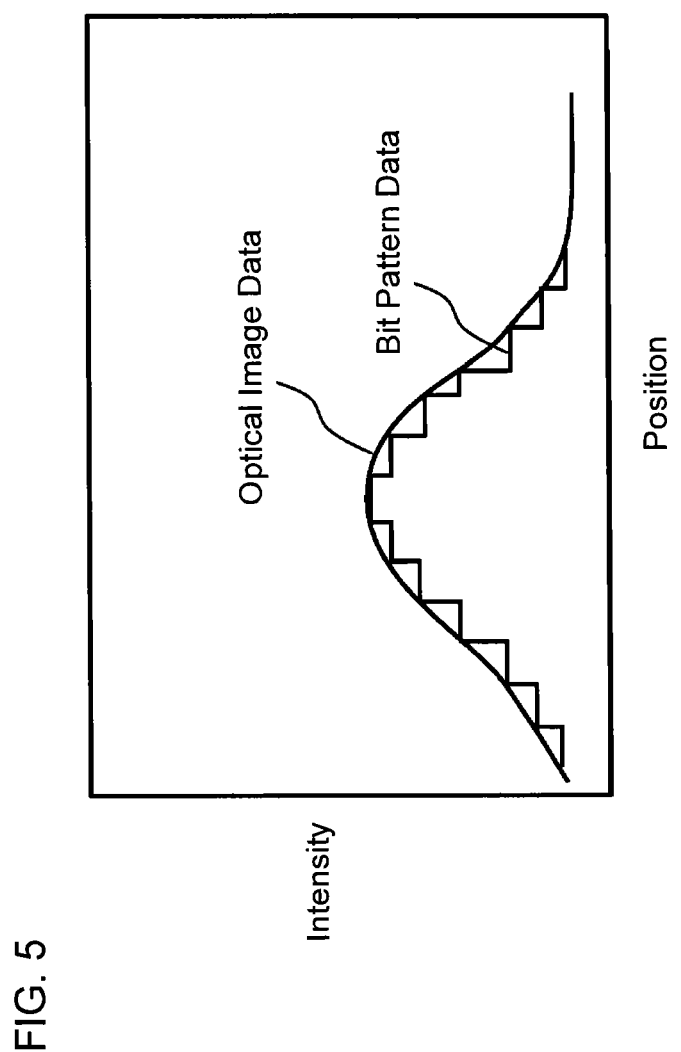
FIG. 5 is a diagram illustrating the filtering according to embodiment 1.

FIG. 5 is a diagram illustrating the filtering.

The optical image (or the measurement data representing it) output from the sensor circuit 106 is somewhat blurred due to the resolution characteristics of the enlarging optical unit 104 and due to the aperture effect in the photodiode array 105, this optical image is a spatially low-pass filtered image. Therefore, since the design image data corresponding to the optical image is digital data consisting of digital values representing the intensity (or gray scale) of each point of the image, this design image data may be filtered to match the blurred optical image, or measurement data. As a result, a reference image to be compared with the optical image of the mask 101 is generated.

<Comparison Step>

As described above, data of the optical image of the mask 101 acquired in step (S1), as shown in FIG. 4, and outputted from the sensor circuit 106 is sent to the comparing circuit 108. After conversion into reference image data by the pattern generating circuit 111 and the reference image generating circuit 112, the pattern data of the mask 101 is also sent to the comparing circuit 108. Further, data indicating the position of the mask 101 on the stage 102, which has been measured by the position measuring system 122 to be sent to the position measuring circuit 107, is also sent to the comparing circuit 108.

The comparing circuit 108 compares each portion of the optical image received from the sensor circuit 106 with the corresponding portion of the reference image generated by the reference image generating circuit 112 in accordance with a suitable comparison determination algorithm, and if the difference between these portions exceeds a predetermined value, the comparing circuit 108 determines that the portion of the optical image is defective. If it is determined from the comparison that a portion of the optical image is defective, then the coordinates of that portion, the optical image, and the reference image, on which the detection of the defect is based, are stored as a mask inspection result 205 (as seen in FIG. 3) in the magnetic disk unit 109.

Identification of defects can be performed according to the following two types of methods. One method is directed to identifying defects when there is a difference exceeding a predetermined threshold dimension between a position of the outline of the reference image and a position of the outline of the optical image. The other method is directed to identifying defects when the ratio of the line width of the pattern in the reference image and the line width of the pattern in the optical image exceeds a predetermined threshold. With the latter method, the ratio of the distance between patterns in the reference image and the distance between patterns in the optical image may be used for identification of defects.

<Fluctuation Value Acquiring Step>

The optical image obtained at the optical image acquiring step (S1) (shown in FIG. 4), is sent from the sensor circuit 106 (shown in FIG. 2), to the first deviation amount acquiring circuit 124 and the second deviation amount acquiring circuit 125. Further, the reference image obtained at the reference image acquiring step (as shown in FIG. 4), is also sent from the reference image generating circuit 112 (as shown in FIG. 2), to the first deviation amount acquiring circuit 124 and the second deviation amount acquiring circuit 125. Further, as shown in FIG. 2, the data indicating the movement position of the stage 102, which has been measured by the position measuring system 122, is sent from the position measuring circuit 107 to the first deviation amount acquiring circuit 124 and the second deviation amount acquiring circuit 125.

The true values of the alignment mark in the position error-correcting unit 10 are stored in the first deviation amount acquiring circuit 124. The average value of true values of the pattern positional coordinates in the position error-correcting unit 10 is stored in the second deviation amount acquiring circuit 125. The average value of the true values can be obtained by obtaining true values of the positional coordinates of the respective patterns, and then obtaining an average value of the true values for each predetermined region.

In the first deviation amount acquiring circuit 124, the positional coordinates of the alignment mark 30 provided in the position error-correcting unit 10 are obtained based upon the respective data sent. Next, the difference between the position coordinate and the true value of the position coordinate of the alignment mark 30 is obtained. Thereby the first deviation amount, that is, the deviation amount from the ideal position of the position error-correcting unit 10 is acquired.

In the second deviation amount acquiring circuit 125, the positional coordinates of the respective patterns provided in the position error-correcting unit 10 are obtained based upon the respective data sent. Next, an average value (an average value of actually measured values) of the positional coordinates of the pattern included in the same predetermined region as that when the average value of true values has been obtained is acquired using the values of the positional coordinates obtained. A difference between the "average value of true values" and the "average value of actually measured values" is calculated. Thereby, regarding the patterns of the position error-correcting unit 10, fluctuation values of the positional coordinates occurring in the inspection process, that is, second deviation amounts are acquired.

Acquisition of the second deviation amount is performed for each stripe, and when the first deviation amount and the second deviation amount of all the stripes have been acquired, the step (S6) (as seen in FIG. 4), is completed.

<Position Correcting Step>

The deviation amount acquired at the first deviation amount acquiring circuit 124 and the deviation amount acquired at the second deviation amount acquiring circuit 125, are sent to the position correcting circuit 126. The data indicating the movement positions of the stage 102 measured by the position measuring system 122 is also sent from the first deviation amount acquiring circuit 124 and the second deviation amount acquiring circuit 125 to the position correcting circuit 126.

In the position correcting circuit 126, the first deviation amount is used to correct the relative positional relationship between the position error-correcting unit 10 and the mask 101. The correction is performed in the following manner, as one example.

The pattern data of the position error-correcting unit 10 is divided into predetermined region units, and the pattern data is corrected for each region unit according to the first deviation amount. The first deviation amount is composed of a displacement amount in the X direction, a displacement amount in the Y direction, and a displacement amount in the θ direction (rotation amount), so that the respective region units are moved according to these displacement amounts. If the size of the region unit is reduced, it becomes possible to respond to a smaller displacement amount, so that the accuracy of the correction can be improved.

In addition, in the position correcting circuit 126, the differences between the positional coordinates of the respective patterns of the position error-correcting unit 10 and the true values of the positional coordinates of the respective patterns corresponding thereto, namely, the second deviation amounts, are used to correct the positions of the respective patterns on the mask 101.

<Map Generating Step>

The fluctuation values of the positional coordinates of the patterns on the mask 101, which have been obtained in the position correcting circuit 126, are sent to the map generating circuit 127. In the map generating circuit 127, a map of the position coordinate fluctuation values on the entire mask pattern is generated based upon these fluctuation values. The map generated is stored in the magnetic disk unit 109 as a mask inspection result 205 (see FIG. 3).

As a result of the three steps described above in FIG. 4, that is, the acquiring step (S6) of acquiring the first deviation amount and the second deviation amount, the position correcting step (S7), and the map generating step (S8), the position errors of the patterns occurring in the inspection process can be known and reduced. These steps will be further described in detail with reference to FIG. 6.

Figure 6:
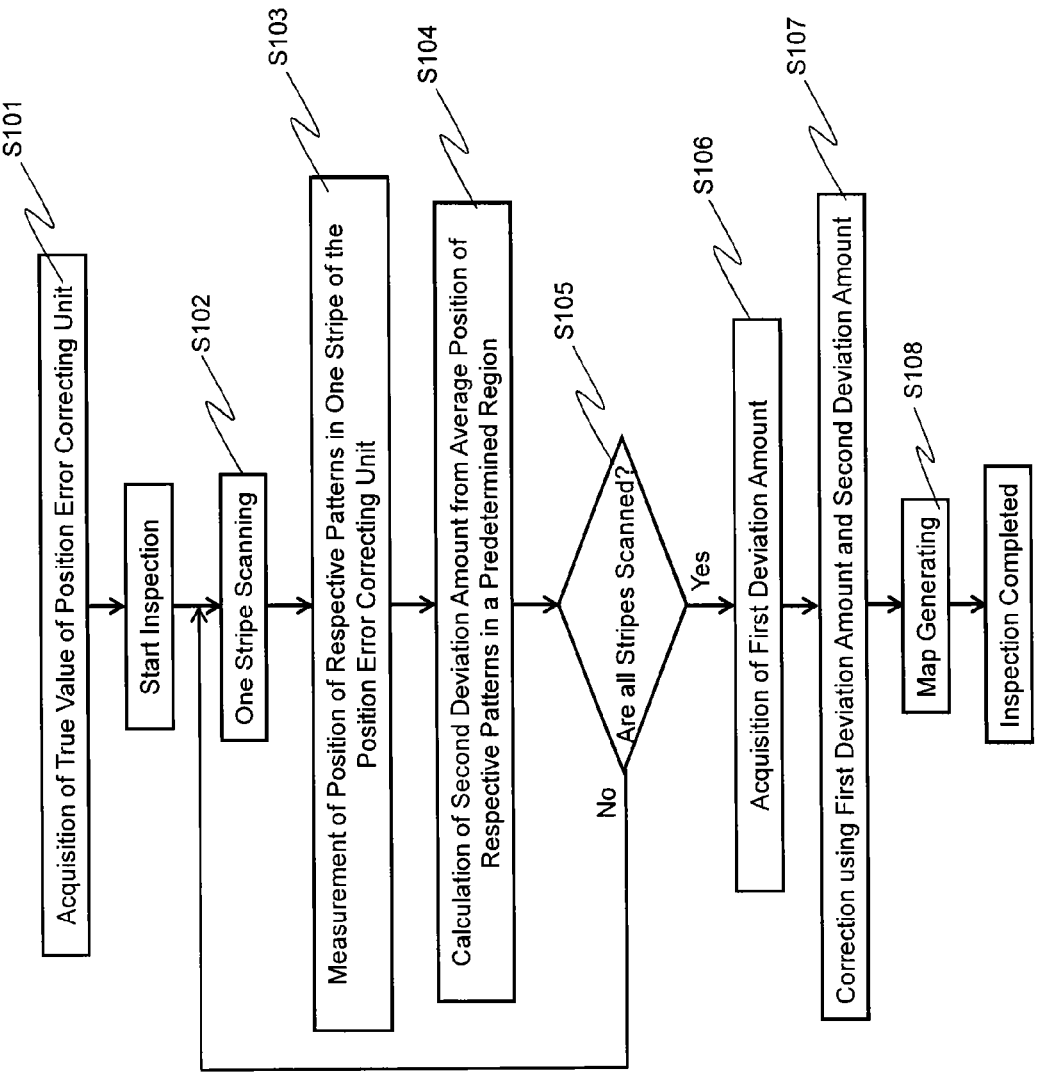
FIG. 6 is a flowchart of a fluctuation value acquiring process, a fluctuation value correcting process, and a map generating process according to embodiment 1.

In seen in FIG. 6, at the step S101, an average value of true values in the position error-correcting unit 10 is acquired. Specifically, the true values of respective alignment marks 30, and the average value of true values of respective positions of coordinates of the pattern are obtained.

The step S101 is performed under conditions different from conditions at step S102 and the steps subsequent thereto in the inspection process. That is, step S101 is not affected by heat and fluctuation of airflow such as that occurring in the inspection process. The true values are measured by a coordinate measuring apparatus such as Model LMS-IPRO manufactured by Leica, or the like.

After the positional coordinates of the true values have been acquired at the step S101, the inspection process (the steps S102 to S107) is started. Incidentally, though omitted in FIG. 6, it goes without saying that the optical image acquiring step (S1), the design pattern data storage step (S2), the pattern generating step (S3), the filtering step (S4), and the comparing step (S5) which are shown in FIG. 4 are also included in the inspection process.

Firstly, one stripe of both the position error-correcting unit 10 and the mask 101 are scanned and image data thereof are acquired (S102).

Next, actually measured values of the positional coordinates of the respective patterns of the position error-correcting unit 10 and actually measured values of the positional coordinates of the inspection pattern of the mask 101 in the one acquired stripe are obtained (S103).

Then, at step S104, an average value of the actually measured values of the respective pattern positions within the predetermined region is calculated based upon the positional coordinates of respective patterns of the position error-correcting unit 10 obtained at the step S103 and a difference between the average value of the actually measured values and the average value of true values obtained at the step S101 is calculated. Thereby, the fluctuation values (a second deviation amount) of the pattern coordinate positions on the position error-correcting unit 10 are obtained. Incidentally, the steps S103 and S104 are performed in the second deviation amount acquiring circuit 125.

Next, at step S105, it is determined whether or not all the stripes have been scanned. The determination can be performed in the control computer 110. If there is a stripe that has not yet been scanned, step S102 and the above-mentioned steps are repeated. On the other hand, when all the stripes have been scanned, step S106 will be performed.

At S106, based on the optical images of the position error-correcting unit 10, the positional coordinates of the alignment marks 30 are obtained. Then, differences between the positional coordinates and the true values of positional coordinates of the alignment marks 30 acquired at S101 are obtained so that the first deviation amount is calculated.

Next, at step S107, the first deviation amounts are used to correct the relative positional relationship between the mask 101 and the position error-correcting unit 10. In addition, the second deviation amounts are used to correct an actually measured value of the positional coordinates of the inspection pattern provided on the mask 101 (obtained at step S103). Incidentally, the step S107 is performed in the position correcting circuit 126.

Next, at step S108, a map of the position coordinate fluctuation values on the entire mask pattern is generated from the fluctuation values of the positional coordinates of the patterns on the mask 101 obtained at the step S107. Step S108 is performed in the map generating circuit 127. The inspection process is completed after step S108 has been performed.

The determination results at the comparing circuit 108, that is, coordinates of defects, the optical image underlying the defect judgment, and the reference image are stored as mask inspection results 205 in the magnetic disk unit 109. Further, the map generated in the map generating circuit 127 is stored as mask inspection results 205 in the magnetic disk unit 109. The mask inspection results 205 are then sent to the review device 500.

The term "review" as used herein refers to an operation performed by the operator to determine whether a detected defect can be tolerated. Specifically, the mask inspection results 205 are sent to the review device 500 for review, the operator performs the review, and then the operator determines whether a pattern defect found in the inspection can be tolerated. The operator can compare the reference image as a basis for the defect judgment with the optical image, which includes the defect for review.

When defect coordinates of defects are observed one by one, the review device 500 displays images of defect portions on a mask while moving the stage on which the mask is set. The review device 500 aligns and displays optical images and reference images simultaneously which serve to display defects visually, and to further display data on the information of the defect portion, on the screen to check. For this screen, the screen of the review device 500 is utilized.

When the inspection system 100 includes the review device 500, the review device 500 displays images of defect portions on the mask using the optical unit of the inspection system 100. The review device 500 aligns and displays optical images and reference images simultaneously which serve to display defects visually, and to further display data on the information of the defect portion, on the screen for the operator to check. For this screen, the screen of the control computer 110 is utilized.

The information of a defect determined through the review process is stored in the magnetic disk unit 109 as shown in FIG. 2. When even one defect to be repaired is confirmed in the review device 500, the mask is sent, with a defect information list 207, to a repair device 600 (see FIG. 3), which is an external device of the inspection system 100. Since the repair method is different according to the type of defect, that is, between the extrusion and intrusion defects, the type of the defect, including determination between the extrusion and intrusion defects and the coordinates of the defect are added to the defect information list 207.

As described above, in this embodiment, the position error-correcting unit is provided on the stage. Then, an inspection region of a sample to be inspected is virtually divided by a plurality of stripes, and a region on the position error-correcting unit is also virtually divided by these stripes. When inspection is performed, the stage is moved so that all the stripes of both the inspection region of the sample to be inspected and the position error-correcting unit are continuously scanned. Actually measured values of the positional coordinates of the respective patterns provided on the position error-correcting unit are obtained based upon the optical image thus obtained. Then, the position errors of the patterns occurring in the inspection process can be reduced by acquiring fluctuation values of the positional coordinates occurring in the inspection process from differences between the average values of the true values of the positional coordinates obtained in advance and the average values of the actually measured values and correcting the positional coordinates of the patterns of the sample to be inspected using the fluctuation values. Further, a distribution of the position errors of the patterns on the sample to be inspected occurring in the inspection process can be known by generating a map of the position coordinate fluctuation values on the entire sample to be inspected from the fluctuation values of the positional coordinates of the patterns on the sample to be inspected.

Further, in the first embodiment, based on the optical images of the position error-correcting unit, the positional coordinates of the alignment marks provided to the position error-correcting unit are obtained. Then, the differences between the positional coordinates and the true values of positional coordinates of the alignment marks obtained in advance are obtained. Thereby, since a deviation amount from the ideal position of the position error-correcting unit on the stage is obtained, the relative positional relationship between the sample to be inspected and the position error-correcting unit can be corrected.

Embodiment 2

The inspection method of this embodiment can be performed with use of the same inspection system as in FIG. 2 illustrated in the first embodiment. However, the second embodiment is different from the first embodiment in that in the first embodiment the relative positional relationship between the sample to be inspected and the position error-correcting unit is corrected. On the other hand, in the second embodiment the inspection is performed after such a relative positional relationship is corrected.

An inspection method according to the present embodiment will be explained using FIG. 1, FIG. 2 and FIG. 7.

Figure 7:
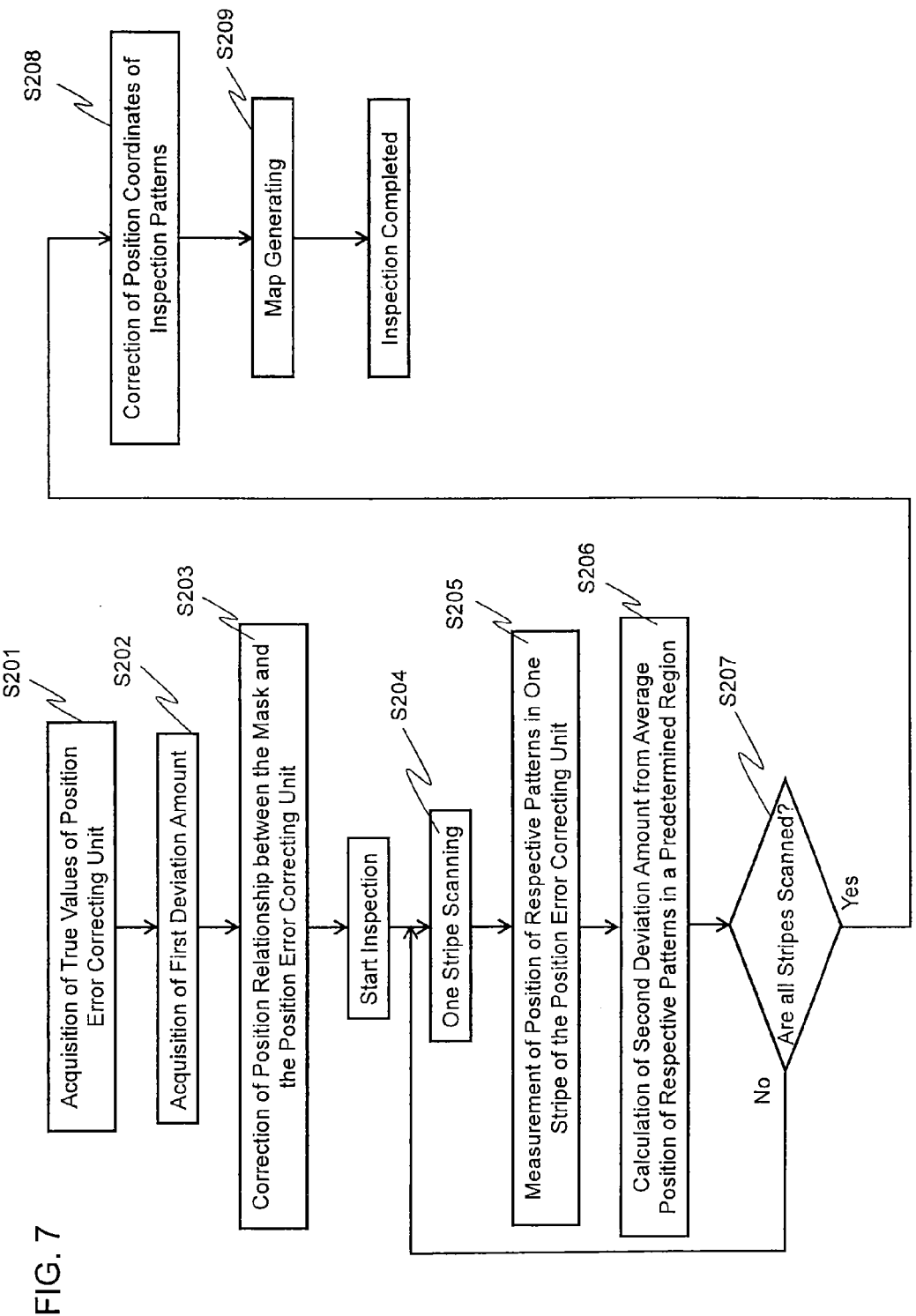
FIG. 7 is a flowchart of an inspection process according to embodiment 2.

In FIG. 7, at the step S201, an average value of true values in the position error-correcting unit 10 in FIG. 1, is acquired. Specifically, the true values of respective alignment marks 30, and the average value of true values of respective positions of coordinates of the pattern are obtained. An average value of the true values is acquired based on the true values of positional coordinates of the respective patterns, and then an average value of the true values for each predetermined region is obtained.

The step S201 is performed under conditions different from conditions at the step S204 and the steps subsequent thereto in the inspection process. That is, the step S201 is not affected by heat and fluctuation of airflow such as that occurring in the inspection process. The true values are measured by a coordinate measuring apparatus such as Model LMS-IPRO manufactured by Leica, or the like.

After the positional coordinates of the true values are acquired at S201, the alignment marks 31 are used to place the mask 101 at a predetermined position on the stage 102. Specifically, the mask 101 is placed on the stage 102 provided so as to be movable horizontally and rotationally by the motors of the respective X, Y, and θ axes. Next, using the motors of the respective X, Y, and θ axes, the alignment marks 31 provided to the mask 101 are used to adjust the position of the stage 102 such that the position of the mask 101 is located at a desired position on the stage 102.

At S106, based on the optical images of the position error-correcting unit 10, the positional coordinates of the alignment marks 30 are obtained. Then, differences between the positional coordinates and the true values of positional coordinates of the alignment marks 30 acquired at S201 are obtained so that the first deviation amount is calculated (S202).

Specifically, step S202 will be performed as follows.

In the inspection system 100 in FIG. 2, the light from the light source 103 is irradiated to the position error-correcting unit 10 and the mask 101 through an illumination optical unit 170. The light transmitted through the position error-correcting unit 10 and the mask 101, reaches the photodiode array 105, thereby forming an optical image thereon. The pattern image formed on the photodiode array is photoelectrically converted by the photodiode array 105, and then A/D (analog to digital) converted by the sensor circuit 106 into an optical image. Next, the optical image is output to the first deviation amount acquiring circuit 124. The reference image is sent from the reference image generating circuit 112, and the data indicating the movement position of the stage 102, which has been measured by the position measuring system 122, is sent from the position measuring circuit 107 to the first deviation amount acquiring circuit 124. The true value of the alignment mark acquired at the step S201, is stored in the first deviation amount acquiring circuit 124.

In the first deviation amount acquiring circuit 124, the actually measured values of the positional coordinates of the alignment mark provided in the position error-correcting unit 10 are obtained based upon the respective data sent. Next, the difference between the actually measured values of the position coordinate and the true value of the position coordinate of the alignment mark 30 is obtained. Thereby the first deviation amount, that is, the deviation amount from the ideal position of the position error-correcting unit 10 is acquired.

Next, at step S203, seen in FIG. 7, the first deviation amounts are used to correct the relative positional relationship between the mask 101 and the position error-correcting unit 10. This is performed in the position correcting circuit 126, shown in FIG. 2.

After step S203, defect detection will be performed as shown in FIG. 7.

Firstly, one stripe of both the position error-correcting unit 10 and the mask 101 are scanned and image data thereof are acquired (S204).

Next, the positional coordinates of the respective patterns of the position error-correcting unit 10, and the positional coordinates of the inspection pattern of the mask 101, in the one acquired stripe are obtained (S205).

Then, at step S206, an average value of the respective pattern positions within the predetermined region is calculated based upon the positional coordinates of respective patterns of the position error-correcting unit 10 obtained at the step S205 and a difference between the average value and the average value of true values obtained at the step S101. Thereby, the fluctuation values (a second deviation amount) of the pattern coordinate positions on the position error-correcting unit 10 are obtained. Incidentally, the steps S205 and S206 are performed in the second deviation amount acquiring circuit 125, as shown in FIG. 2.

The respective steps from S204 to S206 are specifically performed as follows.

As shown in FIG. 1, the inspection region of the mask 101 is virtually divided into a plurality of stripes, and the pattern of the position error-correcting unit 10 is also virtually divided by these stripes.

In FIG. 2, each pattern formed on the mask 101 and the position error-correcting unit 10 is then irradiated with light emitted from the light source 103 disposed above the stage 102. More specifically, the beam of light emitted from the light source 103 passes through the illumination optical unit 170 and is illuminated on the mask 101 and the position error-correcting unit 10. The enlarging optical unit 104, the photodiode array 105, and the sensor circuit 106 are disposed below the stage 102. The light transmitted through the mask 101 and the position error-correcting unit 10 passes through the enlarging optical unit 104 and reaches the photodiode array 105, thereby forming an optical image thereon.

The position error-correcting unit 10 is arranged so that the arrangement direction of the stripes thereof is perpendicular to the moving direction (X direction) of the stage. When the stage 102 moves in the −X direction, images in the first stripes 20a of the mask 101 and the position error-correcting unit 10 are inputted into the photodiode array. Next, when the stage 102 is moved in the X direction, after moving in the −Y direction in a step fashion, images in the second stripes 20b of the mask 101 and the position error-correcting unit 10 are inputted into the photodiode array. Further, when the stage 102 is moved in the −X direction after moving in the −Y direction, images in the third stripes 20c of the mask 101 and the position error-correcting unit 10 are inputted into the photodiode array. In the subsequent steps, images in all the stripes are similarly inputted into the photodiode array.

The pattern image formed on the photodiode array 105 is photoelectrically converted by the photodiode array 105 and A/D (analog to digital) converted by the sensor circuit 106 into an optical image.

The stage 102 can be moved in the X and Y directions and rotated in a θ direction (or in an XY plane) by a drive system such as a 3-axis (X-Y-θ) motor driven by the stage control circuit 114 under the control of the control computer 110. These X-, Y-, and θ-axis motors may be, for example, step motors. The position of the stage 102 is measured by the position measuring system 122, and the measurement data is sent to the position measuring circuit 107.

The optical image of the mask 101 is sent from the sensor circuit 106 to the second deviation amount acquiring circuit 125. The optical image of the position error-correcting unit 10 is also sent from the sensor circuit 106 to the second deviation amount acquiring circuit 125. The reference images of these optical images are sent from the reference image generating circuit 112 to the second deviation amount acquiring circuit 125. Further, the data indicating the movement position of the stage 102, which has been measured by the position measuring system 122, is sent from the position measuring circuit 107 to the second deviation amount acquiring circuit 125.

The average value of true values of the pattern positional coordinates in the position error-correcting unit 10, obtained at the step S201, is stored in the second deviation amount acquiring circuit 125.

In the second deviation amount acquiring circuit 125, the positional coordinates of the respective patterns provided in the position error-correcting unit 10 are obtained based upon the respective data sent. Next, an average value (an average value of actually measured values) of the positional coordinates of the pattern included in the same predetermined region as that when the average value of true values has been obtained is acquired using the values of the positional coordinates obtained. A difference between the "average value of true values" and the "average value of actually measured values" is calculated. Thereby, regarding the patterns of the position error-correcting unit 10, fluctuation values of the positional coordinates occurring in the inspection process, that is, second deviation amounts are acquired.

Next, at step S207, it is determined whether or not all the stripes have been scanned. The determination can be performed in the control computer 110 in FIG. 2. If there is a stripe, which has not been scanned yet, step S204 and the following steps above-mentioned are repeated. On the other hand, when all the stripes have been scanned, step S208 is performed.

In step 208, the second deviation amounts are used to correct an actually measured value of the positional coordinates of the inspection pattern provided on the mask 101 (obtained at step S205). Incidentally, step S208 is performed in the position correcting circuit 126 in FIG. 2.

Next, at step S209, a map of the position coordinate fluctuation values on the entire mask pattern is generated from the fluctuation values of the positional coordinates of the patterns on the mask 101 obtained at step S206. Step S209 is performed in the map generating circuit 127 in FIG. 2. The inspection process is completed after step S209 has been performed.

In the inspection process described above, data of the optical image of the mask 101 outputted from the sensor circuit 106 is sent to the comparing circuit 108. After conversion into reference image data by the pattern generating circuit 111 and the reference image generating circuit 112, the pattern data of the mask 101 is also sent to the comparing circuit 108.

The comparing circuit 108 compares each portion of the optical image received from the sensor circuit 106 with the corresponding portion of the reference image generated by the reference image generating circuit 112 in accordance with a suitable comparison determination algorithm, and if the difference between these portions exceeds a predetermined value, the comparing circuit 108 determines that the portion of the optical image is defective. If it is determined from the comparison that a portion of the optical image is defective, then the coordinates of that portion, the optical image, and the reference image, on which the detection of the defect is based, are stored in the magnetic disk unit 109. Further, the map generated in the map generating circuit 127 is also stored in the magnetic disk unit 109.

The data stored is then sent to the review system as described in the embodiment 1. The information of a defect determined through the review process is stored in the magnetic disk unit 109 as shown in FIG. 2. When even one defect to be repaired is confirmed in the review device, the mask is sent, with a defect information list, to a repair device, which is an external device of the inspection system. Since the repair method is different according to the type of defect, that is, between the extrusion and intrusion defects, the type of the defect, including determination between the extrusion and intrusion defects and the coordinates of the defect are added to the defect information list.

The effect of this embodiment is the same as embodiment 1. That is, the fluctuation values of the positional coordinates occurring in the inspection process are acquired by providing the position error-correcting unit. The position errors of the mask patterns can then be reduced by correcting the positional coordinates of the patterns based on the fluctuation values of the positional coordinates. Moreover the relative positional relationship between the mask and the position error-correcting unit can be corrected based on the position coordinate of the alignment mark of the position error-correcting unit, thereby more precise position of the mask pattern can be known.

Embodiment 3

Figure 8:
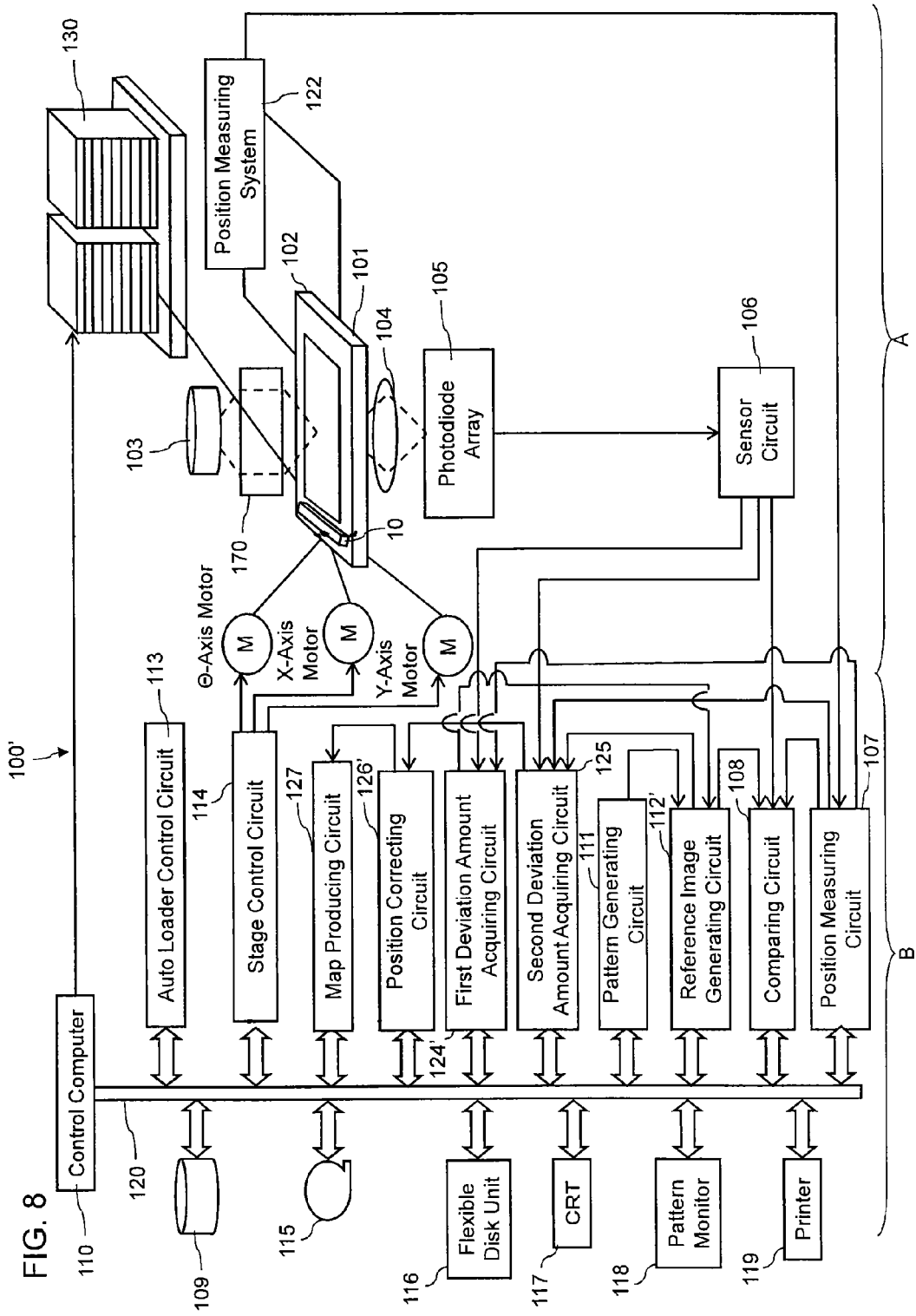
FIG. 8 is a diagram showing the configuration of an inspection system according to embodiment 3.

FIG. 8 is a diagram showing the configuration of an inspection system according to the present embodiment. The individual components of FIG. 8 are the same as those in FIG. 2.

In FIG. 8, the optical image acquiring unit A includes a light source 103, a stage 102 movable in the horizontal X and Y directions and rotatable in a horizontal plane (or in a θ direction), an illumination optical unit 170 serving as a transmission illumination system, an enlarging optical unit 104, a photodiode array 105, a sensor circuit 106, a posit ion measuring system 122, and an auto loader 130. The mask 101 is automatically loaded onto the stage 102 from the auto loader 130 driven by the auto loader control circuit 113, and, upon completion of its inspection, the mask 101 is automatically retrieved from the stage 102.

The position error-correcting unit 10 is provided on the stage 102. A pattern is formed on a surface of the position error-correcting unit 10. The figure pattern may be, for example, a pattern composed of a plurality of cross-shaped patterns, a pattern composed of a plurality of line patterns, a pattern composed of a plurality of contact holes, or the like. In addition to those described above, an alignment mark, which is used to correct the relative positional relationship between the mask 101, and the position error-correcting unit 10, is formed on the position error-correcting unit 10. The alignment mark can be the same as used in embodiment 1, as shown in FIG. 1.

In the control unit B as shown in FIG. 8, a control computer 110 which controls the entire inspection system 100' is connected through a bus 120 (serving as a data transmission path) to a position measuring circuit 107, a comparing circuit 108, a reference image generating circuit 112', a pattern generating circuit 111, a first deviation amount acquiring circuit 124', a second deviation amount acquiring circuit 125, a position correcting circuit 126', a map generating circuit 127 an auto loader control unit 113, a stage control circuit 114, a magnetic disk unit 109 serving as a storage unit, a magnetic tape unit 115, a flexible disk unit 116, a CRT 117, a pattern monitor 118, and a printer 119.

The comparing circuit 108 corresponds to a comparing unit according to the present invention. The first deviation amount acquiring circuit 124' corresponds to a first deviation amount acquiring unit according to the present invention. The second deviation amount acquiring circuit 125 corresponds to a second deviation amount acquiring unit according to the present invention. The position correcting circuit 126' corresponds to a position correcting unit according to the present invention. The map generating circuit 127 corresponds to a map generating unit according to the present invention.

X-, Y-, and θ-axis motors controlled by the stage control circuit 114 drive the stage 102. These motors may be, for example, step motors.

The position of the stage 102 is measured by the position measuring system 122, and the measurement data is sent to the position measuring circuit 107. An optical image output 204 from the sensor circuit 106 is sent to the comparing circuit 108, together with data indicative of the position of the mask 101 on the stage 102, the data is data output from the position measuring circuit 107. The optical image 204 is sent to the first deviation amount acquiring circuit 124' and the second deviation amount acquiring circuit 125.

Design pattern data, which is used as reference data in die-to-database inspection, is stored in the magnetic disk unit 109. This data is read out and sent to the pattern generating circuit 111, when necessary, in the course of the inspection process. The pattern generating circuit 111 converts the design pattern data into image data (or bit pattern data). This image data is then sent to the reference image generating circuit 112' for the generating of reference data. The reference data generated from the design pattern data is sent to the comparing circuit 108.

It should be noted that the inspection system of the present embodiment may include, in addition to the components shown in FIG. 8 described above, other known components used in the process of inspecting masks, for example, the inspection system may include a review device described later.

Figure 9:
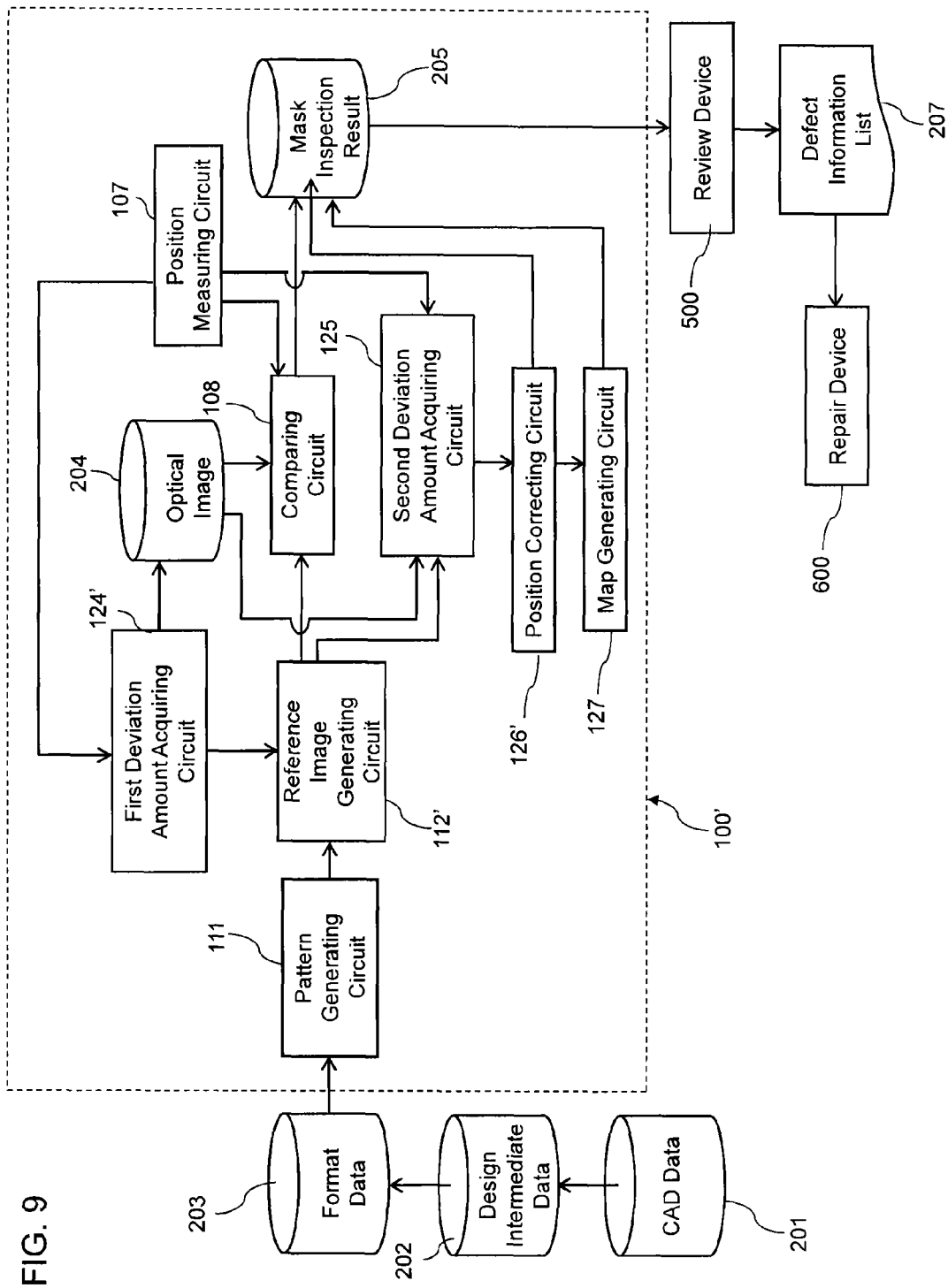
FIG. 9 is a schematic diagram showing a flow of data according to embodiment 3.

FIG. 9 is a schematic diagram showing a flow of data according to the present embodiment.

As shown in FIG. 9, CAD data 201 prepared by the designer (or user) is converted to design intermediate data 202 in a hierarchical format such as OASIS. The design intermediate data 202 includes data of the pattern formed on the mask created for each layer. It should be noted that, generally, inspection systems are not adapted to be able to directly read the design intermediate data 202. That is, each manufacturer of inspection systems uses different format data. Therefore, the design intermediate data 202 is converted, for each layer, to format data 203 in a format specific to the inspection system 100 used, and this format data 203 is input to the inspection system 100'. Although the format data 203 may be data specific to the inspection system 100', the format data 203 may also be data compatible with a writing system.

In the present embodiment, an inspection method adopting the die-to-database method will now be described. A reference image to be compared with an optical image of a sample to be inspected is a reference image generated based upon the write data (design pattern data). Incidentally, the inspection system of the present embodiment can be also applied to the inspection method using the die-to-die method, where the reference image is an optical image different from the sample to be inspected.

Figure 10:
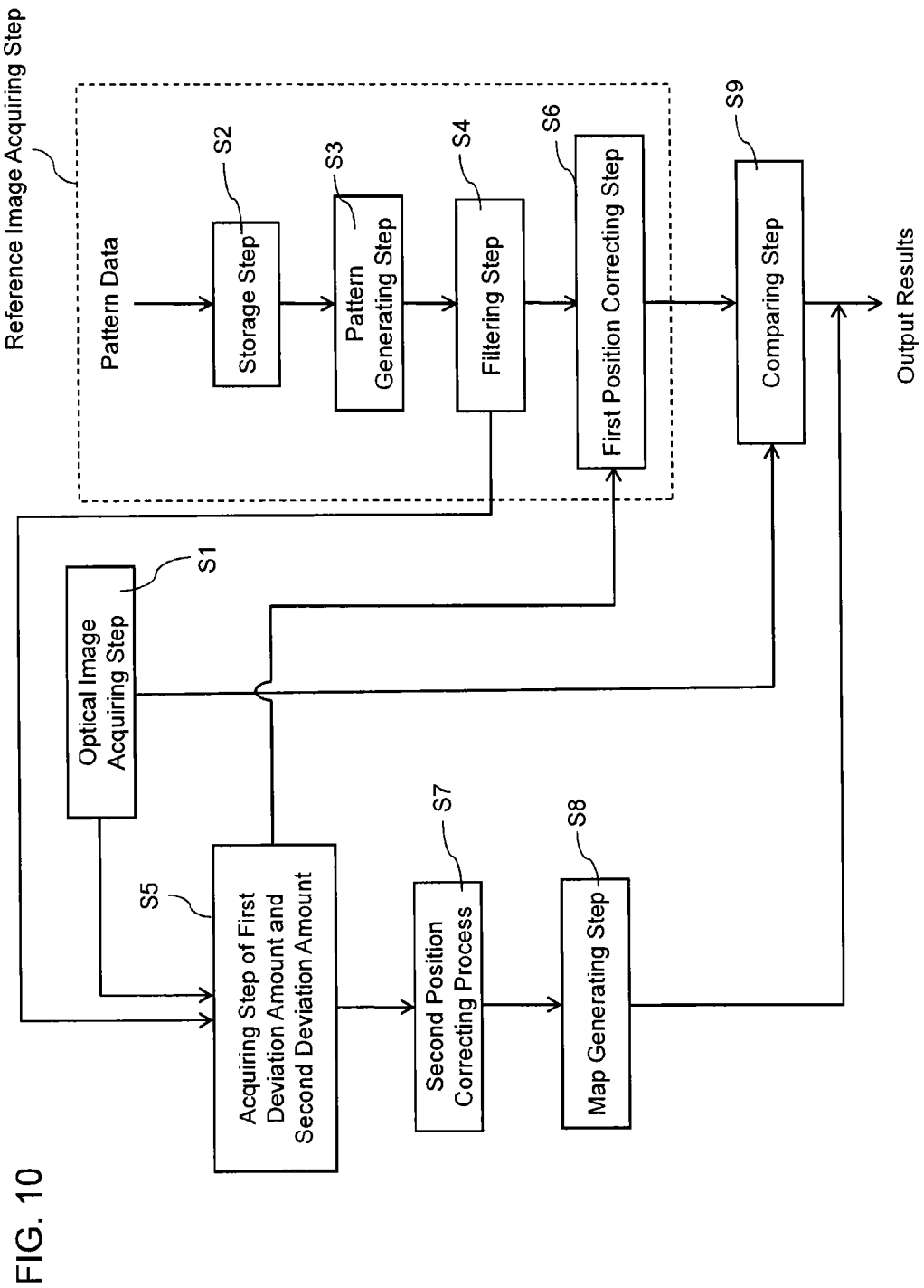
FIG. 10 is a flowchart of an inspection process according to embodiment 3.

As shown in FIG. 10, the inspection process includes an optical image acquiring step (S1); a storage step (S2) for design pattern data, a pattern generating step (S3), a filtering step (S4) and a first position correcting process (S6) (these steps are included in the reference image acquiring step); an acquiring step (S5) of a first deviation amount and a second deviation amount, a second position correcting process (S6), a map generating step (S8) of generating a map of position coordinate fluctuation values on an entire mask pattern, and a comparison step (S5) between an optical image and a reference image. The first position correcting process (S6) is a step for correcting the relative positional relationship between the mask 101 and the position error-correcting unit 10. The second position correcting process (S7) is a step for correcting the positional coordinates of mask patterns.

<Optical Image Acquiring Step>

In the optical image acquiring step (S1) as shown in FIG. 10, an optical image acquiring unit A (shown in FIG. 8) acquires an optical image (hereinafter referred to as measurement data) of the mask 101 and an optical image of the position error-correcting unit 10. The optical image of the mask 101 is an image of a mask on which pattern figures are written based on pattern figure data included in the design pattern. The optical image on the position error-correcting unit 10 includes an image of the alignment mark 30 and an image of a pattern figure for forming a pattern serving as a reference for correcting a position error.

The following is one example of the process in which an optical image is acquired.

The sample, in this instance a mask 101, is mounted on the stage 102, the stage is movable in two horizontal directions using X- and Y-axis motors and rotatable in a horizontal plane using a θ-axis motor. At this time, the alignment mark provided on the mask 101 is used to adjust the position of the stage 102 by means of motors for the respective X, Y, θ axes so that the mask 101 is positioned at a desired position on the stage 102.

The position error-correcting unit 10 is provided on the stage 102. The inspection region of the mask 101 is virtually divided into a plurality of stripes, and the pattern of the position error-correcting unit 10 is also virtually divided by these stripes.

Each pattern formed on the mask 101 and the position error-correcting unit 10 is then irradiated with light emitted from the light source 103 disposed above the stage 102. More specifically, the beam of light emitted from the light source 103 passes through the illumination optical unit 170 and is illuminated on the mask 101 and the position error-correcting unit 10. The enlarging optical unit 104, the photodiode array 105, and the sensor circuit 106 are disposed below the stage 102. The light transmitted through the mask 101 and the position error-correcting unit 10 passes through the enlarging optical unit 104 and reaches the photodiode array 105, thereby forming an optical image thereon.

It should be noted that the enlarging optical unit 104 may have its focus automatically adjusted by an autofocus mechanism (not shown). Further, the position error-correcting unit 10 may be structured so as to be capable of being moved up and down by a spring mechanism or the like. According to this structure, when a mask 101 of different thickness is a sample to be inspected, the height of the mask 101 and the height of the position error-correcting unit 10 can coincide with each other by adjusting the position of the position error-correcting unit 10.

The position error-correcting unit 10 is arranged so that the arrangement direction of the stripes thereof is perpendicular to the moving direction (X direction) of the stage. When the stage 102 moves in the −X direction, images in the first stripes 20a of the mask 101 and the position error-correcting unit 10 are inputted into the photodiode array. Next, when the stage 102 is moved in the X direction, after moving in the −Y direction in a step fashion, images in the second stripes 20b of the mask 101 and the position error-correcting unit 10 are inputted into the photodiode array. Further, when the stage 102 is moved in the −X direction after moving in the −Y direction, images in the third stripes 20c of the mask 101 and the position error-correcting unit 10 are inputted into the photodiode array. In the subsequent steps, images in all the stripes are similarly inputted into the photodiode array.

The pattern image formed on the photodiode array 105 is photoelectrically converted by the photodiode array 105 and A/D (analog to digital) converted by the sensor circuit 106 into an optical image. An image sensor is arranged in the photodiode array 105. As for the image sensor according to the present invention, a line sensor composed of CCD (charge coupled devices) cameras lined up serving as an imaging device is used. The line sensor may be, for example, TDI (Time Delay Integration) sensors. Thus, the pattern on the mask 101 is imaged by these TDI sensors while the stage 102 is continuously moved in the positive or negative X direction. The light source 103, the enlarging optical unit 104, the photodiode array 105, and the sensor circuit 106 together form a high power optical unit inspection.

The stage 102 can be moved in the X and Y directions and rotated in a θ direction (or in an XY plane) by a drive system such as a 3-axis (X-Y-θ) motor driven by the stage control circuit 114 under the control of the control computer 110. These X-, Y-, and θ-axis motors may be, for example, step motors. The position of the stage 102 is measured by the position measuring system 122, and the measurement data is sent to the position measuring circuit 107. The mask 101 is automatically loaded onto the stage 102 from the auto loader 130 driven by the auto loader control circuit 113, and upon completion of the inspection, the mask 101 is automatically retrieved from the stage 102.

The optical image 204, which was acquired in the optical image acquiring step (S1), is sent to the comparing circuit 108, a first deviation amount acquiring circuit 124' and a second deviation amount acquiring circuit 125 as shown in FIG. 8.

<Storage Step>

At the storage step (S2), as seen in FIG. 10, the design pattern data that was used to form the pattern on the mask 101, and the pattern data of the position error-correcting unit 10 are stored in the magnetic disk unit 109 serving as a storage unit.

The designed pattern includes pattern figures each consisting of basic pattern figures such as rectangles and triangles. The magnetic disk unit 109 stores feature data indicating the shape, size, and position of each pattern feature, specifically, information such as the coordinates (x, y) of the reference position of each feature, the length of its sides, and a shape code (or identifier) identifying the type of shape, such as a rectangle or triangle. Further, a pattern figure constituting patterns of the position error-correcting unit 10 may have, for example, a cross shape, a line shape or the like.

A group of pattern figures, defined in an area of approximately a few tens of micrometers square is generally referred to as a "cluster" or "cell". In the storage step, it is common practice that the design pattern data is defined in a hierarchical structure using clusters or cells. A cluster (or cell), which contains a pattern feature or pattern figures, may be used alone or repeated at certain intervals. In the former case the coordinate positions of the cluster (or cell) on the mask are specified, whereas in the latter case the coordinate positions of each copy of the cluster (or cell) are indicated together with a repetition instruction. Each cluster (or cell) is disposed in a strip-shaped region, referred to as a "frame" or "stripe", having a width of a few hundreds of micrometers and a length of approximately 100 mm which corresponds to the length of the mask in the X or Y direction.

<Pattern Generating Step>

At the pattern generating step (S3) in FIG. 10, the pattern generating circuit 111 (shown in FIG. 9) reads design pattern data of the mask 101 from the magnetic disk unit 109 through the control computer 110 and converts it into 2-bit or other multiple-bit image data (bit pattern data). This image data is sent to the reference image generating circuit 112'.

Specifically, upon reading the design pattern data, the pattern generating circuit 111 generates data of each pattern feature, and interprets the shape code in the data indicative of the shape of the pattern feature and obtains its dimensions. The pattern generating circuit 111 then divides the pattern into a virtual grid of squares (or grid elements) having predetermined quantization dimensions, and generates 2-bit or other multiple-bit design image data of the design pattern segment in each grid element. By using the generated design image data, the pattern generating circuit 111 calculates the design pattern occupancy in each grid element (corresponding to a sensor pixel). This pattern occupancy in each pixel represents the pixel value.

<Filtering Step>

At the filtering step (S4) in FIG. 10, after receiving the design image data the reference image generating circuit 112' performs appropriate filtering on the data.

The optical image (or the measurement data representing the optical image) output from the sensor circuit 106 is somewhat blurred due to the resolution characteristics of the enlarging optical unit 104 and due to the aperture effect in the photodiode array 105, this optical image is a spatially lowpass filtered image. Therefore, since the design image data corresponding to the optical image is digital data consisting of digital values representing the intensity (or gray scale) of each point of the image, this design image data may be filtered to match the blurred optical image, or measurement data, as shown in FIG. 5 (embodiment 1). A reference image obtained in this way is sent to the second deviation amount acquiring circuit 125.

<Deviation Amounts Acquiring Step>

The step S5 as shown in FIG. 10, is a step for acquiring a first deviation amount and a second deviation amount. This step will specifically be performed as follows.

The optical image obtained at the optical image acquiring step (S1), as seen in FIG. 10, is sent from the sensor circuit 106, shown in FIG. 8, to the first deviation amount acquiring circuit 124' and to the second deviation amount acquiring circuit 125. Further, the reference image obtained at step S4 as shown in FIG. 10, is also sent from the reference image generating circuit 112', as seen in FIG. 9, to the second deviation amount acquiring circuit 125. Further, as shown in FIG. 9, the data indicating the movement position of the stage 102, which has been measured by the position measuring system 122, is sent from the position measuring circuit 107 to the first deviation amount acquiring circuit 124' and to the second deviation amount acquiring circuit 125.

The true values of the alignment mark in the position error-correcting unit 10, for example, positional coordinates measured by a coordinate measuring apparatus such as Model LMS-IPRO manufactured by Leica, or the like, are stored in the first deviation amount acquiring circuit 124'. The average value of true values of the pattern positional coordinates in the position error-correcting unit 10 is stored in the second deviation amount acquiring circuit 125. The average value of the true values can be obtained by acquiring true values of the positional coordinates of the respective patterns by the same coordinate measuring apparatus as the mentioned above, and then obtaining an average value of the true values for each predetermined region.

In the first deviation amount acquiring circuit 124', the positional coordinates of the alignment mark 30 provided in the position error-correcting unit 10 are obtained based upon the respective data sent. Next, the difference between the positional coordinates and the true value of the positional coordinates of the alignment mark 30 is calculated. Thereby the first deviation amount, that is, the deviation amount from the ideal position of the position error-correcting unit 10 is obtained.

In the second deviation amount acquiring circuit 125, the positional coordinates of the respective patterns provided in the position error-correcting unit 10 are obtained based upon the respective data sent. Next, an average value (an average value of actually measured values) of the positional coordinates of the pattern included in the same predetermined region as that when the average value of true values has been obtained is acquired using the values of the positional coordinates obtained. A difference between the "average value of true values" and the "average value of actually measured values" is calculated. Thereby, regarding the patterns of the position error-correcting unit 10, fluctuation values of the positional coordinates occurring in the inspection process, that is, second deviation amounts are acquired.

Acquiring the second deviation amount is performed for each stripe, and when the first deviation amount and the second deviation amount of all the stripes have been acquired, the step (S5) shown in FIG. 10, is completed.

<First Position Correcting Step>

Step S6 (FIG. 10) is the first position correcting step. At this step, based on the first deviation amount obtained at S5, the positional coordinates of the reference image obtained at S4 are corrected. That is, the value of the first deviation amount obtained at the first deviation amount acquisition circuit 124' (FIG. 9) is sent to the reference image generating circuit 112'. Then, in the reference image generating circuit 112' the first deviation amount is used to generate a reference image in which the relative positional relationship between the position error-correcting unit 10 and the mask 101 has been corrected. This correction can be performed in the following manner, as one example.

The pattern data of the position error-correcting unit 10 is divided into predetermined region units, and the pattern data is corrected for each region unit according to the first deviation amount. The first deviation amount is composed of a displacement amount in the X direction, a displacement amount in the Y direction, and a displacement amount in the θ direction (rotation amount), so that the respective region units are moved according to these displacement amounts. If the size of the region unit is reduced, it becomes possible to respond to a smaller displacement amount, so that the accuracy of the correction can be improved.

<Second Position Correcting Step>

Step S7 in FIG. 10 is the second position correcting step. This step is performed in the position correcting circuit 126' in FIG. 9. To the position correcting circuit 126', the second deviation amount is sent from the second deviation amount acquisition circuit 125. Then, this value is used to correct the positions of the respective patterns on the mask 101.

<Map Generating Step>

Step S8 as shown in FIG. 10, is a map generating step. This process will specifically be performed as follows. In FIG. 9, the fluctuation values of the positional coordinates of the patterns on the mask 101, which have been obtained in the position correcting circuit 126', are sent to the map generating circuit 127. In the map generating circuit 127, a map of the position coordinate fluctuation values on the entire mask pattern is generated based upon these fluctuation values. The map generated is stored in the magnetic disk unit 109 as a mask inspection result 205.

<Comparing Step>

Step S9 as shown in FIG. 10, is a comparing step. This specific process will now be described.

As shown in FIG. 9, data of the optical image of the mask 101 acquired in step S1 (as shown in FIG. 10) and outputted from the sensor circuit 106 is sent to the comparing circuit 108. After conversion into reference image data by the pattern generating circuit ill and the reference image generating circuit 112', the first positional correction is performed, the corrected reference image data of the mask 101 is sent to the comparing circuit 108. Further, data indicating the position of the mask 101 on the stage 102, which has been measured by the position measuring system 122 to be sent to the position measuring circuit 107, is also sent to the comparing circuit 108.

The comparing circuit 108 compares each portion of the optical image received from the sensor circuit 106 with the corresponding portion of the reference image generated by the reference image generating circuit 112' in accordance with a suitable comparison determination algorithm, and if the difference, between these portions exceeds a predetermined value, the comparing circuit 108 determines that the portion of the optical image is defective. If it is determined from the comparison that a portion of the optical image is defective, then the coordinates of that portion, the optical image, and the reference image, on which the detection of the defect is based, are stored as a mask inspection result 205 (see FIG. 3) in the magnetic disk unit 109.

Identification of defects can be performed according to the following two types of methods. One method is directed to identifying defects when there is a difference exceeding a predetermined threshold dimension between a position of the outline of the reference image and a position of the outline of the optical image. The other method is directed to identifying defects when the ratio of the line width of the pattern in the reference image and the line width of the pattern in the optical image exceeds a predetermined threshold. With the latter method, the ratio of the distance between patterns in the reference image and the distance between patterns in the optical image may be used for identification of defects.

As described above, the determination results at the comparing circuit 108, that is, coordinates of defects, the optical image underlying the defect judgment, and the reference image of the optical image are stored in the magnetic disk unit 109. Further, the map generated in the map generating circuit 127 is stored as mask inspection results 205 in the magnetic disk unit 109. After that, these images are sent to the review device 500 for review, the review is performed by the operator and the operator determines whether a pattern defect found in the inspection can be tolerated. The operator can compare the reference image as a basis for the defect judgment with the optical image, which includes the defect.

The information of a defect determined through the review process is stored in the magnetic disk unit 109 as shown in FIG. 8. When even one defect to be repaired is confirmed in the review process, the mask is sent, with a defect information list, to a repair device, which is an external device of the inspection system 100'. Since the repair method is different according to the type of defect, that is, between the extrusion and intrusion defects, the type of the defect, including determination between the extrusion and intrusion defects and the coordinates of the defect are added to the defect information list.

The effect of this embodiment is the same as embodiment 1. That is, the fluctuation values of the positional coordinates occurring in the inspection process are acquired by providing the position error-correcting unit. The position errors of the mask patterns can then be reduced by correcting the positional coordinates of the patterns based on the fluctuation values of the positional coordinates. Moreover the relative positional relationship between the mask and the position error-correcting unit can be corrected based on the position coordinate of the alignment mark of the position error-correcting unit, thereby the more precise position of the mask pattern can be known.

Embodiment 4

Figure 17:
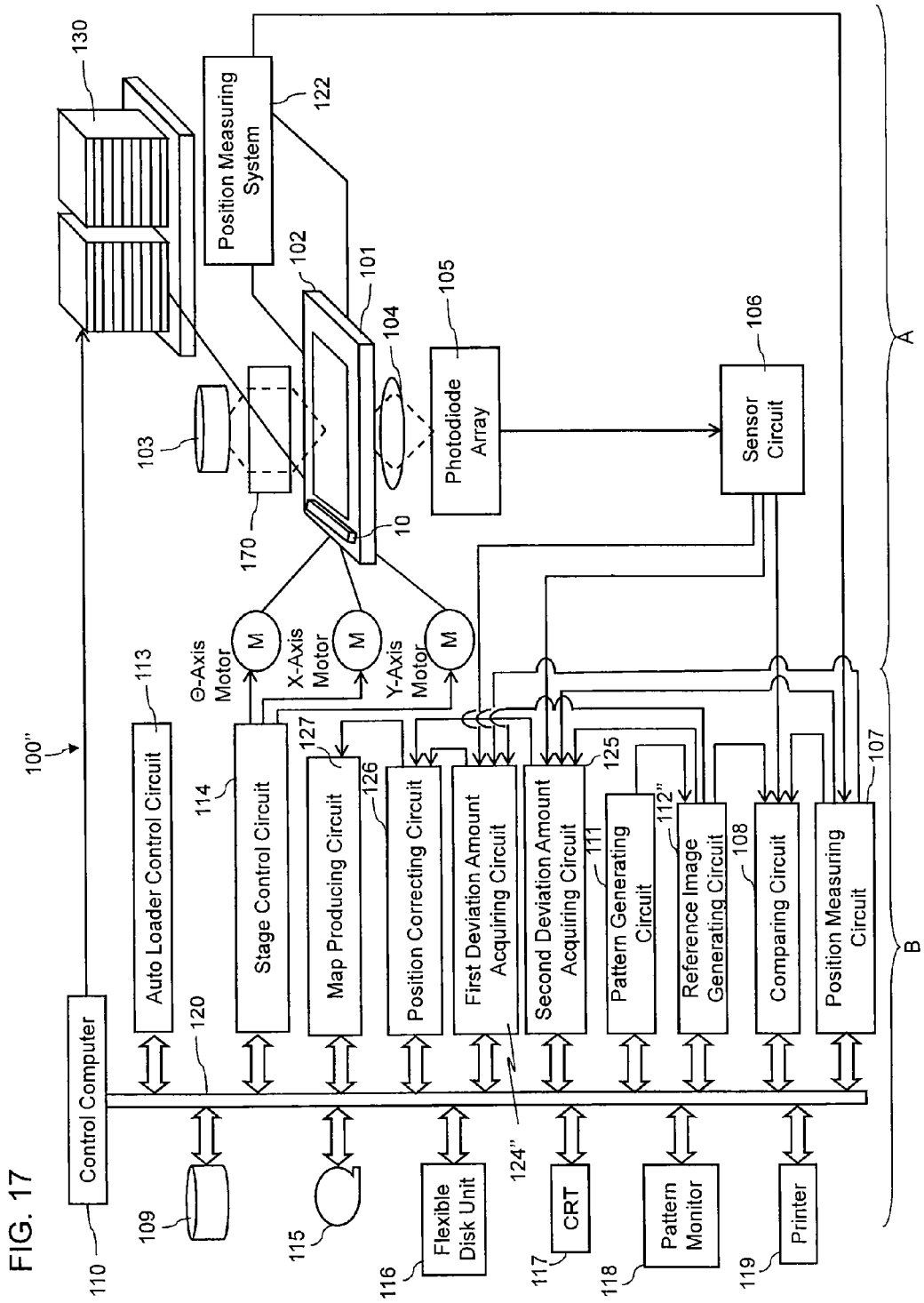
FIG. 17 is a diagram showing the configuration of an inspection system according to embodiment 4.

The inspection method of this embodiment can be performed with use of the inspection system as in FIG. 17 illustrated in the first embodiment. The reference numbers and symbols used in FIG. 2 are the same as those used in this embodiment and therefore will not be repeated.

In the first, second and third embodiments the relative positional relationship between the mask and the position error-correcting unit can be corrected based on the position coordinates of the alignment mark of the position error-correcting unit, The present embodiment differs to first, second and third embodiments, in the point of correction without the alignment mark.

An inspection method according to the present embodiment will be explained using FIG. 1, FIG. 11 and FIG. 17.

In the present embodiment, as well as in embodiment 1 (FIG. 1), the pattern provided in the position error-correcting unit 10 is virtually divided into the same stripes as stripes dividing the inspection region on the mask 101, namely, nine stripes from the first stripe 20a to the ninth stripe 20i.

The alignment marks provided on the mask 101 are used to place the mask 101 at a predetermined position on the stage 102. Specifically, the mask 101 is placed on the stage 102 provided so as to be movable horizontally and rotationally by the motors of the respective X, Y, and θ axes. Next, using the motors of the respective X, Y, and θ axes, the alignment marks provided on the mask 101 are used to adjust the position of the stage 102 such that the position of the mask 101 is located at a desired position on the stage 102.

Figure 11:
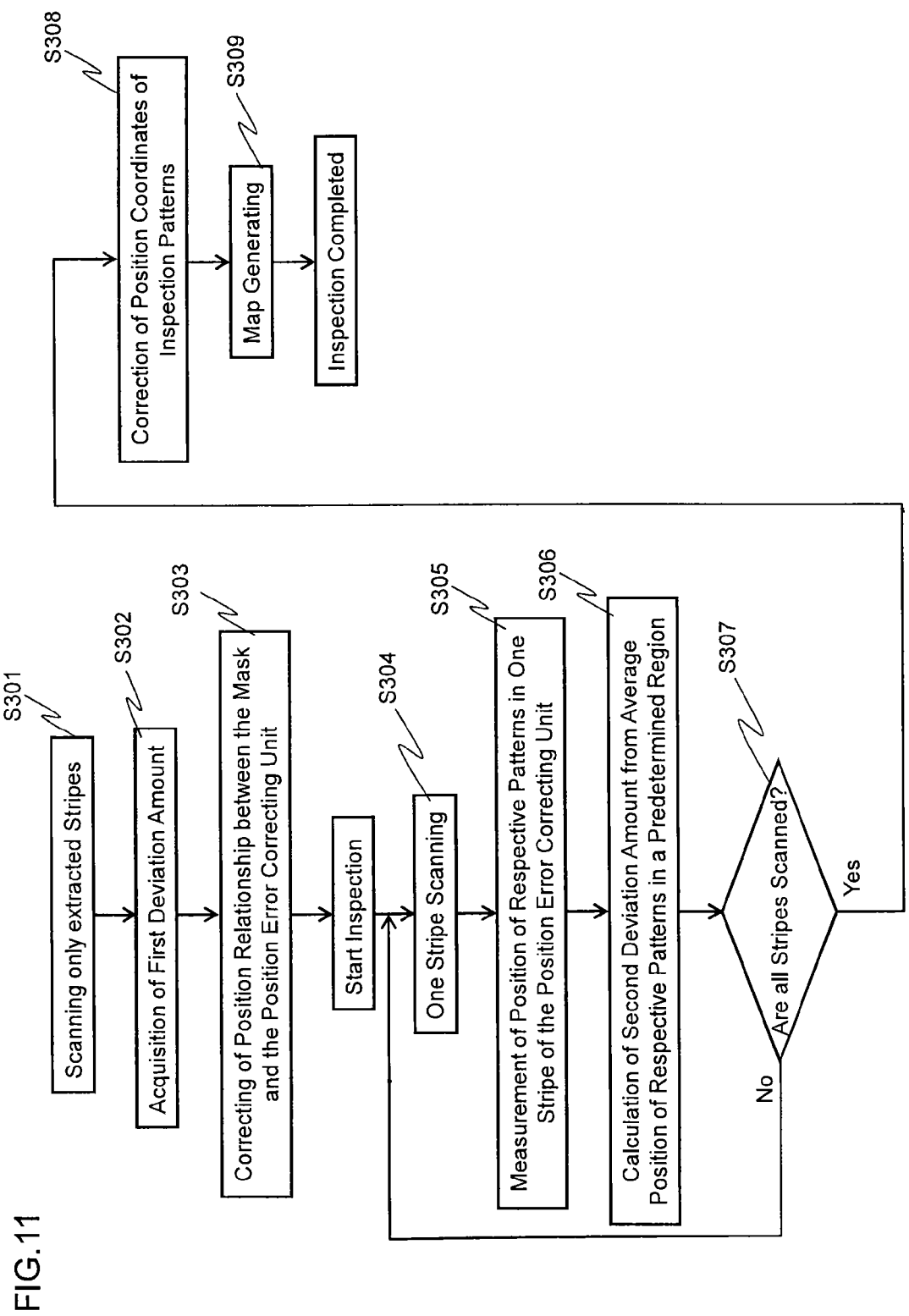
FIG. 11 is a flowchart of an inspection process according to embodiment 4.

Next, at step S301, as seen in FIG. 11, optical images of the position error-correcting unit 10 and the mask 101 are acquired. At this time, not all of these stripes are scanned, only the stripes extracted at predetermined intervals are scanned.

For example, as shown in FIG. 1, the inspection region on the mask 101 is virtually divided toward the Y direction by nine stripes from the first stripe 20a to the ninth stripe 20i. Similarly, the pattern on the position error-correcting unit 10 is also virtually divided by the same stripes, that is, by the stripes from the first stripe 20a to the ninth stripe 20i. Regarding both the inspection region on the mask 101 and the position error-correcting unit 10, the stage 102 is moved such that all the stripes are continuously scanned.

At step S301 in FIG. 11, the first stripe 20a, the third stripe 20c, the fifth stripe 20e, the seventh stripe 20g, and the ninth stripe 20i are extracted, and the stage 102 is moved such that these stripes in both the inspection region of the mask 101 and the position error-correcting unit 10 are continuously scanned.

Incidentally, though the number of stripes to be extracted is not particularly limited, a larger number thereof improves the accuracy of correction of the relative positional relationship between the mask 101 and the position error-correcting unit 10, but increases the time required for step S301, and therefore it is preferred that the number is determined in consideration of both. In addition, it is preferred that the stripes are averagely extracted over the entire position error-correcting unit 10 and the mask 101, and it is not preferred that the stripes are extracted in a partially-biased fashion, since the accuracy of correction is reduced.

According to the inspection system 100' as shown in FIG. 17, the reference image is generated in the same fashion as embodiment 1. Specifically, the design pattern data that was used to form the pattern on the mask 101, and the pattern data of the position error-correcting unit 10 are stored in the magnetic disk unit 109. The pattern generating circuit 111 reads design pattern data of the mask 101 from the magnetic disk unit 109 through the control computer 110 and converts it into 2-bit or other multiple-bit image data (bit pattern data). This image data is sent to the reference image generating circuit 112". In the reference image generating circuit 112' the design image data from the pattern generating circuit performs appropriate filtering on the data. As a result, a reference image to be compared with the optical image is generated.

The optical image obtained in the step S301 is sent from the sensor circuit 106 to the first deviation amount acquiring circuit 124". Further, the reference images of these optical images are sent from the reference image generating circuit 112" to the first deviation amount acquiring circuit 124". Further, the data indicating the movement position of the stage 102, which has been measured by the position measuring system 122, is sent from the position measuring circuit 107 to the first deviation amount acquiring circuit 124".

The step S302, as shown in FIG. 11, is performed in the first deviation amount acquiring circuit 124", the optical image obtained at the step S301 and the reference image corresponding to the optical image are overlapped, thereby the deviation amount from the ideal position of the position error-correcting unit 10, that is, the first deviational amount is acquired.

The first deviation amount acquired at the first deviation amount acquiring circuit 124" is sent to the position correcting circuit 126, further in the position correcting circuit 126 step S303 is performed. The first deviation amount is used to correct the relative positional relationship between the mask 101 and the position error-correcting unit 10.

In the position correcting circuit 126, the first deviation amount is used to correct the relative positional relationship between the position error-correcting unit 10 and the mask 101.

After step S303, the inspection process will be performed as shown in FIG. 11.

Firstly, one stripe of both the positional error-correcting unit 10 and the mask 101 are scanned and the image data thereof is acquired (S304).

Next, the positional coordinates of the respective patterns of the position error-correcting unit 10 and the positional coordinates of the inspection pattern of the mask 101 in the one acquired stripe are obtained (S305).

Then, at step S306, an average value of the respective pattern positions within the predetermined region is calculated based upon the positional coordinates of respective patterns of the position error-correcting unit 10 obtained at step S305 and a difference between the average value and the average value of true values obtained previously are calculated. Thereby, the fluctuation values (a second deviation amount) of the pattern coordinate positions on the position error-correcting unit 10 are obtained. Incidentally, the steps S305 and S306 are performed in the second deviation amount acquiring circuit 125, as shown in FIG. 8.

The respective steps from S304 to S306 are specifically performed as follows.

In FIG. 17, each pattern formed on the mask 101 and the position error-correcting unit 10 is then irradiated with light emitted from the light source 103 disposed above the stage 102. More specifically, the beam of light emitted from the light source 103 passes through the illumination optical unit 170 and is illuminated on the mask 101 and the position error-correcting unit 10. The enlarging optical unit 104, the photodiode array 105, and the sensor circuit 106 are disposed below the stage 102. The light transmitted through the mask 101 and the position error-correcting unit 10 passes through the enlarging optical unit 104 and reaches the photodiode array 105, thereby forming an optical image thereon.

The position error-correcting unit 10 is arranged so that the arrangement direction of the stripes thereof is perpendicular to the moving direction (X direction) of the stage. When the stage 102 moves in the −X direction, images in the first stripes 20*a* of the mask 101 and the position error-correcting unit 10 are inputted into the photodiode array. Next, when the stage 102 is moved in the X direction, after moving in the −Y direction in a step fashion, images in the second stripes 20*b* of the mask 101 and the position error-correcting unit 10 are inputted into the photodiode array. Further, when the stage 102 is moved in the −X direction after moving in the −Y direction, images in the third stripes 20*c* of the mask 101 and the position error-correcting unit 10 are inputted into the photodiode array. In the subsequent steps, images in all the stripes are similarly inputted into the photodiode array.

The pattern image formed on the photodiode array 105 is photoelectrically converted by the photodiode array 105 and A/D (analog to digital) converted by the sensor circuit 106 into an optical image.

The stage 102 can be moved in the X and Y directions and rotated in a θ direction (or in an XY plane) by a drive system such as a 3-axis (X-Y-θ) motor driven by the stage control circuit 114 under the control of the control computer 110. These X-, Y-, and θ-axis motors may be, for example, step motors. The position of the stage 102 is measured by the position measuring system 122, and the measurement data is sent to the position measuring circuit 107.

The optical image of the mask 101 is sent from the sensor circuit 106 to the second deviation amount acquiring circuit 125. The optical image of the position error-correcting unit 10 is also sent from the sensor circuit 106 to the second deviation amount acquiring circuit 125. The reference images of these optical images are sent from the reference image generating circuit 112" to the second deviation amount acquiring circuit 125. Further, the data indicating the movement position of the stage 102, which has been measured by the position measuring system 122, is sent from the position measuring circuit 107 to the second deviation amount acquiring circuit 125.

The average value of true values of the pattern positional coordinates in the position error-correcting unit 10 is stored in the second deviation amount acquiring circuit 125. This value can be acquired using the same technique as in embodiment 1. That is, in the process which is not affected by heat and fluctuation of airflow, the accurate position of respective patterns on the position error-correcting unit 10 are measured by a coordinate measuring apparatus such as model LMS-IPRO manufactured by Leica or the like. Thereby, the true value of the positional coordinates of the respective patterns is acquired, then, the average value of these for each predetermined region is calculated, therefore the average of true values can be acquired.

In the second deviation amount acquiring circuit 125, the positional coordinates of the respective patterns provided in the position error-correcting unit 10 are obtained based upon the respective data sent. Next, an average value (an average value of actually measured values) of the positional coordinates of the pattern included in the same predetermined region as that when the average value of true values has been obtained is acquired using the values of the positional coordinates obtained. A difference between the "average value of true values" and the "average value of actually measured values" is calculated. Thereby, regarding the patterns of the position error-correcting unit 10, fluctuation values of the positional coordinates occurring in the inspection process, that is, second deviation amounts are acquired.

Next, at step S307, it is determined whether or not all the stripes have been scanned. The determination can be performed in the control computer 110 in FIG. 17. If there is a stripe that has not yet been scanned, step S304 and the above-mentioned steps are repeated. On the other hand, when all the stripes have been scanned, Step S308 is performed.

In step S308, the second deviation amounts are used to correct an actually measured value of the positional coordinates of the inspection pattern provided on the mask 101 (obtained at step S305). Incidentally, step 308 is performed in the position correcting circuit 126 in FIG. 17.

Next, at step S309, a map of the position coordinate fluctuation values on the entire mask pattern is generated from the fluctuation values of the positional coordinates of the patterns on the mask 101 obtained at the step S306. Step S309 is performed in the map generating circuit 127 in FIG. 17. The inspection process is completed after step S309 has been performed.

In the inspection process described above, data of the optical image of the mask 101 outputted from the sensor circuit 106 is sent to the comparing circuit 108. After conversion into reference image data by the pattern generating circuit 111 and the reference image generating circuit 112", the pattern data of the mask 101 is sent to the comparing circuit 108.

The comparing circuit 108 compares each portion of the optical image received from the sensor circuit 106 with the corresponding portion of the reference image generated by the reference image generating circuit 112" in accordance with a suitable comparison determination algorithm, and if the difference, between these portions exceeds a predetermined value, the comparing circuit 108 determines that the portion of the optical image is defective. If it is determined from the comparison that a portion of the optical image is defective, then the coordinates of that portion, the optical image, and the reference image, on which the detection of the defect is based, are stored in the magnetic disk unit 109. Further, the map generated in the map generating circuit 127 is also stored in the magnetic disk unit 109.

The data stored is then sent to the review system as described in the embodiment 1. The information of a defect determined through the review process is stored in the magnetic disk unit 109 as shown in FIG. 17. When even one defect to be repaired is confirmed in the review device, the mask is sent with a defect information list, to a repair device, which is an external device of the inspection system 100". Since the repair method is different according to the type of defect, that is, between the extrusion and intrusion defects, the type of defect, including determination between the extrusion and intrusion defects and the coordinates of the defect are added to the defect information list.

The effect of this embodiment is the same as in embodiment 1. That is, the fluctuation values of the positional coordinates occurring in the inspection process are acquired by providing the position error-correcting unit. The position errors of the mask patterns can then be reduced by correcting the positional coordinates of the patterns based on the fluctuation values of the positional coordinates. Moreover the relative positional relationship between the mask and the position error-correcting unit can be corrected. Before the inspection process, the position error-correcting unit and the mask are partially scanned to acquire the optical images, these images are then overlapped, thereby, a more precise position of the mask pattern can be known.

Embodiment 5

In the first, second and third embodiments the relative positional relationship between the mask and the position error-correcting unit can be corrected based on the position coordinate of the alignment mark of the position error-correcting unit. However, in the present embodiment, a load sensor is used instead of an alignment mark to correct a relative positional relationship.

The inspection method of this embodiment can be performed with use of the same inspection system 100 as illustrated in the first embodiment. An inspection method according to the present embodiment will now be explained using FIG. 2, FIG. 12 and FIG. 13.

Firstly, the alignment marks are used to place the mask 101 at a predetermined position on the stage 102 (as shown in FIG. 2). Specifically, the mask 101 is placed on the stage 102 provided so as to be movable horizontally and rotationally by the motors of the respective X, Y, and θ axes. Next, using the motors of the respective X, Y, and θ axes, the alignment marks provided on the mask 101 are used to adjust the position of the stage 102 such that the position of the mask 101 is located at a desired position on the stage 102.

Next, the relative positional relationship between the mask 101 and the position error-correcting unit 10 will be corrected.

Figure 12:
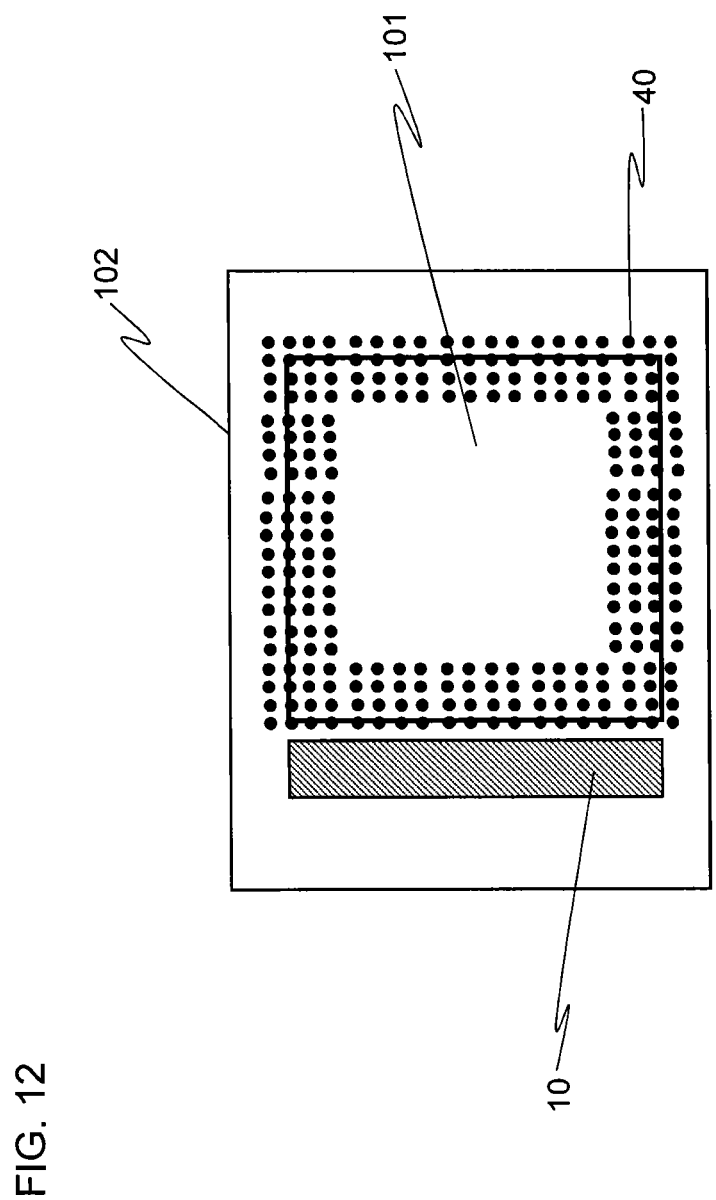
FIG. 12 is a plane view showing a stage on which load sensors are disposed, according to embodiment 5.

In this embodiment, as shown in FIG. 12, load sensors 40 are disposed on the stage 102. The load sensors 40 are not required to be disposed over the whole stage 102, but are only required to be disposed close to a position in which the edge of the mask 101 is located.

The load sensor 40 can be a piezoelectric sensor in which electrode films are provided on front and back faces of a piezoelectric body and wirings are connected to the electrode films. When a load is applied in a thickness direction of the piezoelectric body, dielectric polarization occurs in the piezoelectric body and electric charges are generated in the electrode films. Then, since current flows to a circuit through the wirings, the load applied to the sensor can be known by measuring the current value. The measurement is performed in the following manner, as one example.

An electric charge Q generated in the piezoelectric sensor and a load W applied to the sensor have a relationship of $Q=aW$ (where "a" is a constant of proportion). Therefore, a current I is expressed as $I=a(dW/dt)$ (where t is time). The current I is measured via an input impedance of a voltmeter. For example, by connecting the wirings connected to the electrode films of the piezoelectric sensor to a voltage recorder, an output proportional to a load velocity $dW/dt$ is obtained. Therefore, by integrating dW/dt, a waveform proportional to the load W can be obtained.

Figure 13:
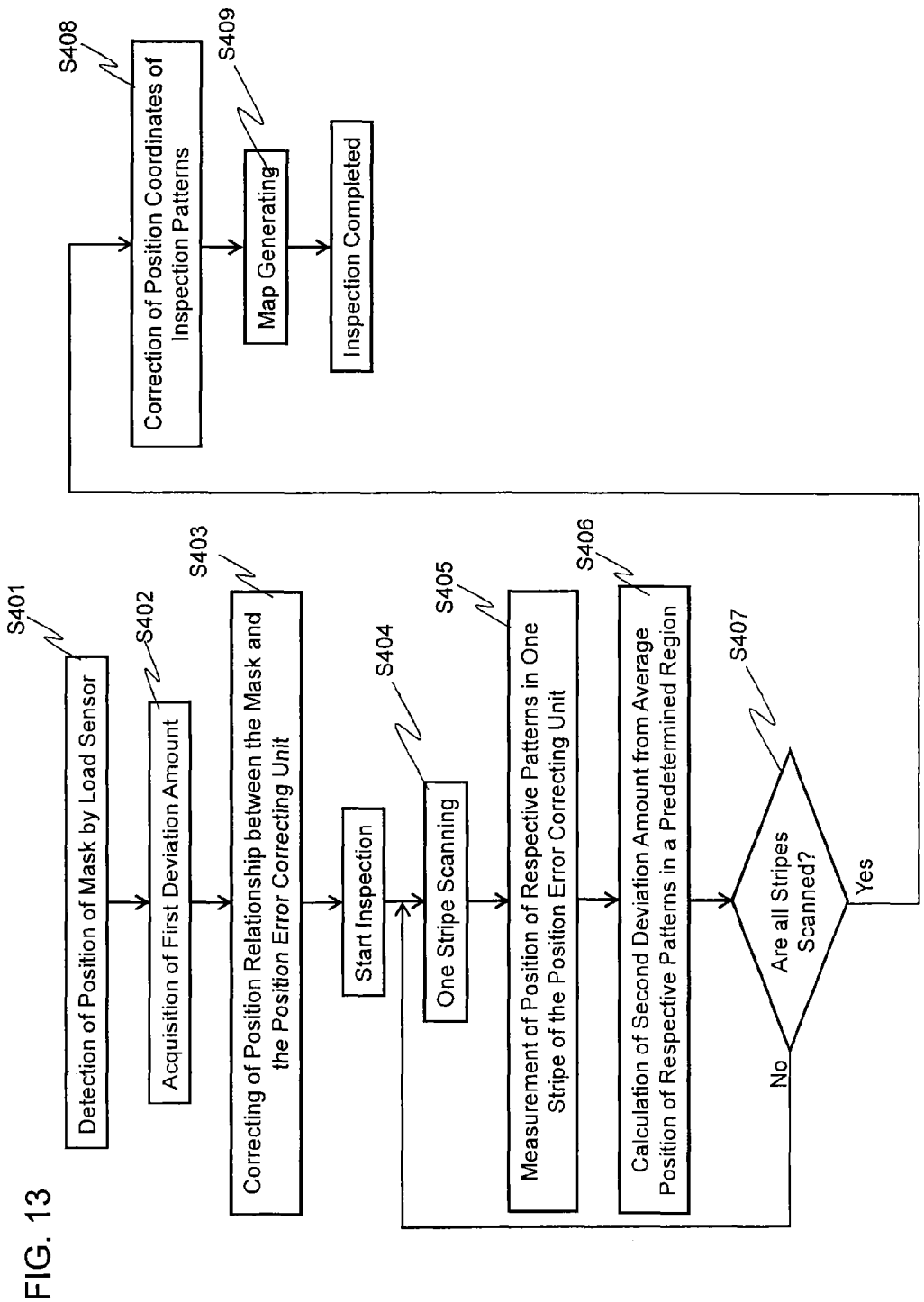
FIG. 13 is a flowchart of an inspection process according to embodiment 5.

In this embodiment, the load sensors 40 detect the position of the mask 101 first (step S401, as shown in FIG. 13.) For example, the values of the load W for respective load sensors 40 can be known from the output values recorded in the voltage recorder, so that, from these values, the presence or absence of the mask 101 on the respective load sensors 40 or distances from the respective sensors 40 to the mask 101 is detected so that the position of the mask 101 on the stage 102 can be obtained.

Once the position of the mask 101 is detected, the relative relationship between the mask 101 and the position error-correcting unit 10 is obtained, so that the deviation amount from the ideal position of the position error-correcting unit 10, namely, the first deviation amount is also obtained (step S402). Next, the relative positional relationship between the mask 101 and the position error-correcting unit 10 is corrected using the first deviation amount (S403).

After step S403, the inspection process will be performed as shown in FIG. 13.

Firstly, one stripe of both the positional error-correcting unit 10 and the mask 101 are scanned and the image data thereof is acquired (S404).

Next, the positional coordinates of the respective patterns of the position error-correcting unit 10 and the positional coordinates of the inspection pattern of the mask 101 in the one acquired stripe are obtained (S405).

Next, at step S406, an average value of the respective pattern positions within the predetermined region is calculated based upon the positional coordinates of respective patterns of the position error-correcting unit 10 obtained at the step S405 and a difference between the average value and the average value of true values obtained previously are calculated. Thereby, the fluctuation values (a second deviation amount) of the pattern coordinate positions on the position error-correcting unit 10 are obtained. Incidentally, the steps S405 and S406 are performed in the second deviation amount acquiring circuit 125, as shown in FIG. 2.

The respective steps from S404 to S406 are specifically performed as follows.

In FIG. 2, each pattern formed on the mask 101 and the position error-correcting unit 10 is then irradiated with light emitted from the light source 103 disposed above the stage 102. More specifically, the beam of light emitted from the light source 103 passes through the illumination optical unit 170 and is illuminated on the mask 101 and the position error-correcting unit 10. The enlarging optical unit 104, the photodiode array 105, and the sensor circuit 106 are disposed below the stage 102. The light transmitted through the mask 101 and the position error-correcting unit 10 passes through the enlarging optical unit 104 and reaches the photodiode array 105, thereby forming an optical image thereon.

The position error-correcting unit 10 is arranged so that the arrangement direction of the stripes thereof is perpendicular to the moving direction (X direction) of the stage. When the stage 102 moves in the −X direction, images in the first stripes 20*a* of the mask 101 and the position error-correcting unit 10 are inputted into the photodiode array. Next, when the stage 102 is moved in the X direction, after moving in the −Y direction in a step fashion, images in the second stripes 20*b* of the mask 101 and the position error-correcting unit 10 are inputted into the photodiode array. Further, when the stage 102 is moved in the −X direction after moving in the −Y direction, images in the third stripes 20*c* of the mask 101 and the position error-correcting unit 10 are inputted into the photodiode array. In the subsequent steps, images in all the stripes are similarly inputted into the photodiode array.

The pattern image formed on the photodiode array 105 is photoelectrically converted by the photodiode array 105 and A/D (analog to digital) converted by the sensor circuit 106 into an optical image.

The stage 102 can be moved in the X and Y directions and rotated in a θ direction (or in an XY plane) by a drive system such as a 3-axis (X-Y-θ) motor driven by the stage control circuit 114 under the control of the control computer 110. These X-, Y-, and θ-axis motors may be, for example, step motors. The position of the stage 102 is measured by the position measuring system 122, and the measurement data is sent to the position measuring circuit 107.

The optical image of the mask 101 is sent from the sensor circuit 106 to the second deviation amount acquiring circuit 125. The optical image of the position error-correcting unit 10 is also sent from the sensor circuit 106 to the second deviation amount acquiring circuit 125. The reference images of these optical images are sent from the reference image generating circuit 112 to the second deviation amount acquiring circuit 125. Further, the data indicating the movement position of the stage 102, which has been measured by the position measuring system 122, is sent from the position measuring circuit 107 to the second deviation amount acquiring circuit 125.

The average value of true values of the pattern positional coordinates in the position error-correcting unit 10 is stored in the second deviation amount acquiring circuit 125. This value can be acquired using the same technique as in embodiment. 1, that is, in the process which is not affected by heat and fluctuation of airflow, the accurate position of respective patterns on the position error-correcting unit 10 are measured by a coordinate measuring apparatus such as model LMS-IPRO manufactured by Leica or the like. Thereby, the true value of the positional coordinates of the respective patterns are acquired, the average value of these for each predetermined region is then calculated, therefore the average of true values can be acquired.

In the second deviation amount acquiring circuit 125, the positional coordinates of the respective patterns provided in the position error-correcting unit 10 are obtained based upon the respective data sent. Next, an average value (an average value of actually measured values) of the positional coordinates of the pattern included in the same predetermined region as that when the average value of true values has been obtained is acquired using the values of the positional coordinates obtained. A difference between the "average value of true values" and the "average value of actually measured values" is calculated. Thereby, regarding the patterns of the position error-correcting unit 10, fluctuation values of the positional coordinates occurring in the inspection process, that is, second deviation amounts are acquired.

Next, at step S407, it is determined whether or not all the stripes have been scanned. The determination can be performed in the control computer 110 in FIG. 2. If there is a stripe which has not been scanned yet, step S404 and the above-mentioned steps are repeated. On the other hand, when all the stripes have been scanned, step S408 is performed.

In step S408, the second deviation amounts are used to correct an actually measured value of the positional coordinates of the inspection pattern provided on the mask 101 (obtained at step S405). Incidentally, step 408 is performed in the position correcting circuit 126 in FIG. 2.

Next, at step S409, a map of the position coordinate fluctuation values on the entire mask pattern is generated from the fluctuation values of the positional coordinates of the patterns on the mask 101 obtained at the step S406. Step S409 is performed in the map generating circuit 127 in FIG. 2. The inspection process is completed after step S409 has been performed.

In the inspection process described above, data of the optical image of the mask 101 outputted from the sensor circuit 106 is sent to the comparing circuit 108. After conversion into reference image data by the pattern generating circuit 111 and the reference image generating circuit 112, the pattern data of the mask 101 is also sent to the comparing circuit 108.

The comparing circuit 108 compares each portion of the optical image received from the sensor circuit 106 with the corresponding portion of the reference image generated by the reference image generating circuit 112 in accordance with a suitable comparison determination algorithm, and if the difference, between these portions exceeds a predetermined value, the comparing circuit 108 determines that the portion of the optical image is defective. If it is determined from the comparison that a portion of the optical image is defective, then the coordinates of that portion, the optical image, and the reference image, on which the detection of the defect is based, are stored in the magnetic disk unit 109. Further, the map generated in the map generating circuit 127 is also stored in the magnetic disk unit 109.

The data stored is then sent to the review system as described in embodiment 1. The information of a defect determined through the review process is stored in the magnetic disk unit 109 as shown in FIG. 2. When even one defect to be repaired is confirmed in the review device, the mask is sent along with a defect information list to a repair device, which is an external device of the inspection system. Since the repair method is different according to the type of defect, that is, between the extrusion and intrusion defects, the type of the defect, including determination between the extrusion and intrusion defects and the coordinates of the defect are added to the defect information list.

The effect of this embodiment is the same as in embodiment 1. That is, the fluctuation values of the positional coordinates occurring in the inspection process are acquired by providing the position error-correcting unit. The position errors of the mask patterns can then be reduced by correcting the positional coordinates of the patterns based on the fluctuation values of the positional coordinates. Moreover the relative positional relationship between the mask and the position error-correcting unit can be corrected. Before the inspection process, the position of the mask is measured by the load sensor provided at the stage, then using the result, the relative positional relationship between the mask and the position error-correcting unit is corrected, thereby, a more accurate position of the mask pattern can be known.

Embodiment 6

In the first, second and third embodiments the relative positional relationship between the mask and the position error-correcting unit can be corrected based on the position coordinate of the alignment mark of the position error-correcting unit. However, in the present embodiment, a distance sensor instead of an alignment mark is used to correct the relative positional relationship.

The inspection method of this embodiment can be performed with use of the same inspection system 100 as illustrated in the first embodiment. An inspection method according to the present embodiment will now be explained using FIG. 2, FIG. 14 and FIG. 15.

Firstly, the alignment marks are used to place the mask 101 at a predetermined position on the stage 102. Specifically, the mask 101 is placed on the stage 102 provided so as to be movable horizontally and rotationally by the motors of the respective X, Y, and θ axes. Next, using the motors of the respective X, Y, and θ axes, the alignment marks provided on the mask 101 are used to adjust the position of the stage 102 such that the position of the mask 101 is located at a desired position on the stage 102.

Next, the relative positional relationship between the mask 101 and the position error-correcting unit 10 will be corrected.

Figure 14:
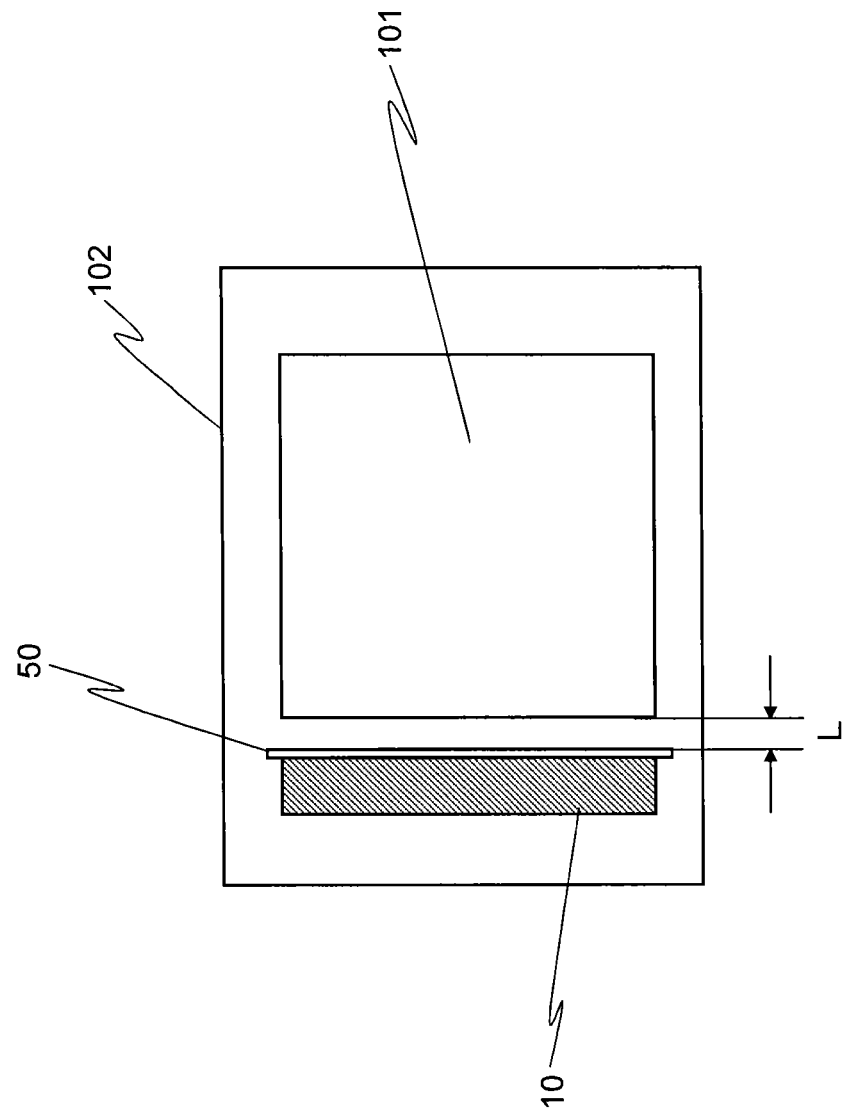
FIG. 14 is a plane view showing a stage on which a position error-correcting unit including a distance sensor is disposed, according to embodiment 6.

The position error-correcting unit 10 is fixed on the stage 102, as in the cases of the first to fifth embodiments. The sixth embodiment, as shown in FIG. 14, is characterized by a distance sensor 50 disposed on a face of the position error-correcting unit 10 opposite the mask 101.

Inside the distance sensor 50, for example, a light source, such as an LED or a laser diode, and a light-receiving element are provided. Light from the light source is reflected by the stage 102, and received by the light-receiving element. By converting this reflected light into data of a distance, the distance from the position error-correcting unit 10 to the mask 102 can be obtained.

The position error-correcting unit 10 is provided with a plurality of distance sensors 50 and these distance sensors 50 measure distances from the position error-correcting unit 10 to the mask 102 at predetermined intervals. Thereby, the position of the mask 101 on the stage 102 can be obtained. In the sixth embodiment, at step S501 in FIG. 15, the position of the mask 101 is detected by this method.

Once the position of the mask 101 is obtained, the relative relationship between the mask 101 and the position error-correcting unit 10 is obtained, so that the deviation amount from the ideal position of the position error-correcting unit 10, namely, the first deviation amount is also obtained (step S502). Next, the relative positional relationship between the mask 101 and the position error-correcting unit 10 is corrected using the first deviation amount (S503).

Figure 15:
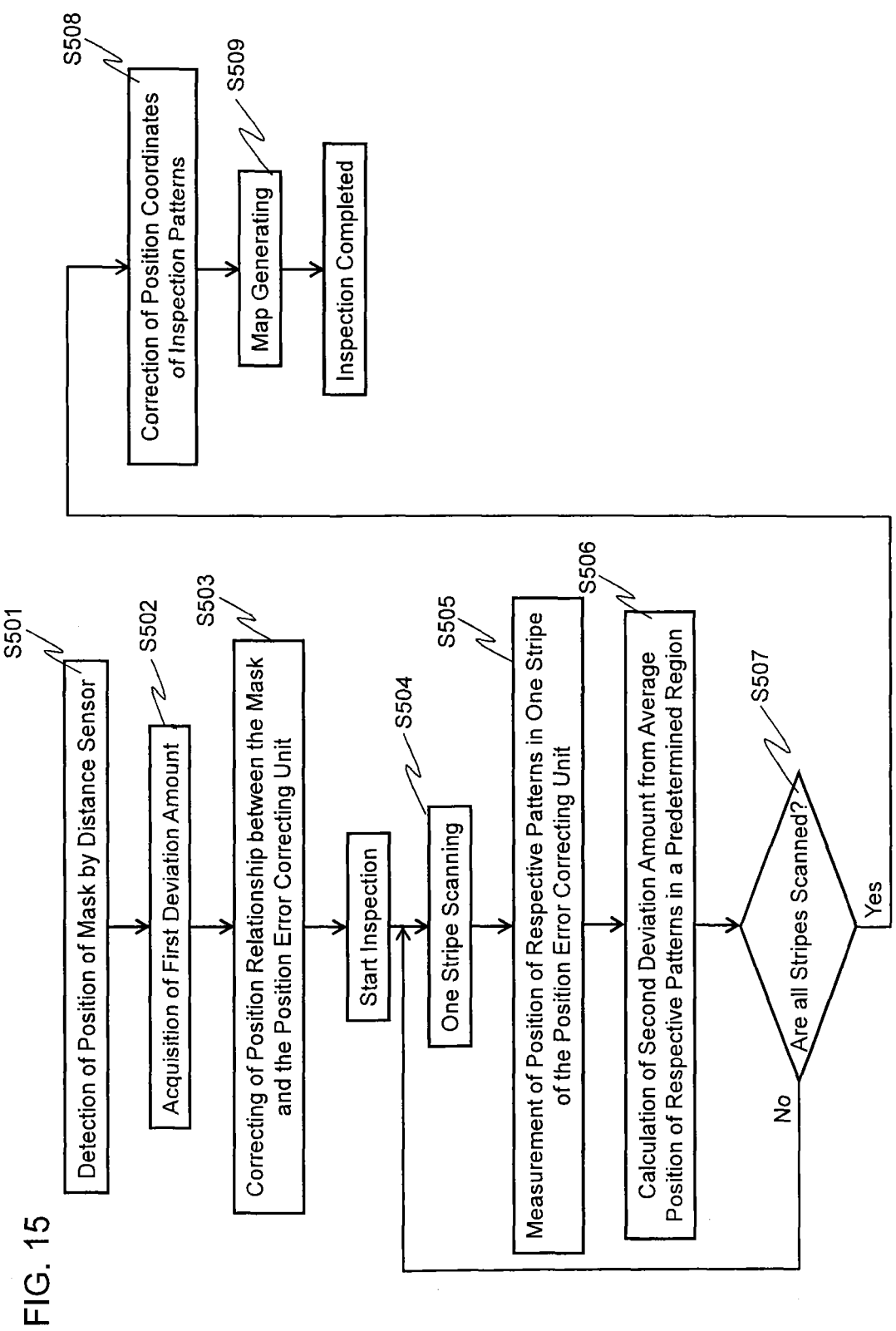
FIG. 15 is a flowchart of an inspection process according to embodiment 6.

After step S503, the inspection process will be performed as shown in FIG. 15.

Firstly, one stripe of both the positional error-correcting unit 10 and the mask 101 are scanned and the image data thereof are acquired (S504).

Next, the positional coordinates of the respective patterns of the position error-correcting unit 10 and the positional coordinates of the inspection pattern of the mask 101 in the one acquired stripe are obtained (S505).

Then, at step S506, an average value of the respective pattern positions within the predetermined region is calculated based upon the positional coordinates of respective patterns of the position error-correcting unit 10 obtained at the step S505 and a difference between the average value and the average value of true values obtained previously are calculated. Thereby, the fluctuation values (a second deviation amount) of the pattern coordinate positions on the position error-correcting unit 10 are obtained. Incidentally, the steps S505 and S506 are performed in the second deviation amount acquiring circuit 125, as shown in FIG. 2.

The respective steps from S504 to S506 are specifically performed as follows.

In FIG. 2, each pattern formed on the mask 101 and the position error-correcting unit 10 is then irradiated with light emitted from the light source 103 disposed above the stage 102. More specifically, the beam of light emitted from the light source 103 passes through the illumination optical unit 170 and is illuminated on the mask 101 and the position error-correcting unit 10. The enlarging optical unit 104, the photodiode array 105, and the sensor circuit 106 are disposed below the stage 102. The light transmitted through the mask 101 and the position error-correcting unit 10 passes through the enlarging optical unit 104 and reaches the photodiode array 105, thereby forming an optical image thereon.

The position error-correcting unit 10 is arranged so that the arrangement direction of the stripes thereof is perpendicular to the moving direction (X direction) of the stage. When the stage 102 moves in the −X direction, images in the first stripes 20a of the mask 101 and the position error-correcting unit 10 are inputted into the photodiode array. Next, when the stage 102 is moved in the X direction, after moving in the −Y direction in a step fashion, images in the second stripes 20b of the mask 101 and the position error-correcting unit 10 are inputted into the photodiode array. Further, when the stage 102 is moved in the −X direction after moving in the −Y direction, images in the third stripes 20c of the mask 101 and the position error-correcting unit 10 are inputted into the photodiode array. In the subsequent steps, images in all the stripes are similarly inputted into the photodiode array.

The pattern image formed on the photodiode array 105 is photoelectrically converted by the photodiode array 105 and A/D (analog to digital) converted by the sensor circuit 106 into an optical image.

The stage 102 can be moved in the X and Y directions and rotated in a θ direction (or in an XY plane) by a drive system such as a 3-axis (X-Y-θ) motor driven by the stage control circuit 114 under the control of the control computer 110. These X-, Y-, and θ-axis motors may be, for example, step motors. The position of the stage 102 is measured by the position measuring system 122, and the measurement data is sent to the position measuring circuit 107.

The optical image of the mask 101 is sent from the sensor circuit 106 to the second deviation amount acquiring circuit 125. The optical image of the position error-correcting unit 10 is also sent from the sensor circuit 106 to the second deviation amount acquiring circuit 125. The reference images of these optical images are sent from the reference image generating circuit 112 to the second deviation amount acquiring circuit 125. Further, the data indicating the movement position of the stage 102, which has been measured by the position measuring system 122, is sent from the position measuring circuit 107 to the second deviation amount acquiring circuit 125.

The average value of true values of the pattern positional coordinates in the position error-correcting unit 10 is stored in the second deviation amount acquiring circuit 125. This value can be acquired using the same technique as in embodiment 1, that is, in the process which is not affected by heat and fluctuation of airflow, the accurate position of respective patterns on the position error-correcting unit 10 are measured by a coordinate measuring apparatus such as model LMS-IPRO manufactured by Leica or the like. Thereby, the true value of the positional coordinates of the respective patterns are acquired, the average value of these for each predetermined region is then calculated, therefore the average of true values can be acquired.

In the second deviation amount acquiring circuit 125, the positional coordinates of the respective patterns provided in the position error-correcting unit 10 are obtained based upon the respective data sent. Next, an average value (an average value of actually measured values) of the positional coordinates of the pattern included in the same predetermined region as that when the average value of true values has been obtained is acquired using the values of the positional coordinates obtained. A difference between the "average value of true values" and the "average value of actually measured values" is calculated. Thereby, regarding the patterns of the position error-correcting unit 10, fluctuation values of the positional coordinates occurring in the inspection process, that is, second deviation amounts are acquired.

Next, at step S507, it is determined whether or not all the stripes have been scanned. The determination can be performed in the control computer 110 in FIG. 2. If there is a stripe that has not been scanned yet, step S504 and the above-mentioned steps are repeated. If, on the other hand all the stripes have been scanned, step S508 is performed.

In step S508, the second deviation amounts are used to correct an actually measured value of the positional coordinates of the inspection pattern provided on the mask 101 (obtained at step S505). Incidentally, step 508 is performed in the position correcting circuit 126 in FIG. 2.

Next, at step S509, a map of the position coordinate fluctuation values on the entire mask pattern is generated from the fluctuation values of the positional coordinates of the patterns on the mask 101 obtained at the step S506. Step S509 is performed in the map generating circuit 127 in FIG. 2. The inspection process is completed after step S509 has been performed.

In the inspection process described above, data of the optical image of the mask 101 outputted from the sensor circuit 106 is sent to the comparing circuit 108. After conversion into reference image data by the pattern generating circuit 111 and the reference image generating circuit 112, the pattern data of the mask 101 is also sent to the comparing circuit 108.

The comparing circuit 108 compares each portion of the optical image received from the sensor circuit 106 with the corresponding portion of the reference image generated by the reference image generating circuit 112 in accordance with a suitable comparison determination algorithm, and if the difference, between these portions exceeds a predetermined value, the comparing circuit 108 determines that the portion of the optical image is defective. If it is determined from the comparison that a portion of the optical image is defective, then the coordinates of that portion, the optical image, and the reference image, on which the detection of the defect is based, are stored in the magnetic disk unit 109. Further, the map generated in the map generating circuit 127 is also stored in the magnetic disk unit 109.

Then, the data stored is sent to the review system as described in embodiment 1. The information of a defect determined through the review process is stored in the magnetic disk unit 109 as shown in FIG. 2. When even one defect to be repaired is confirmed in the review device, the mask is sent along with a defect information list, to a repair device, which is an external device of the inspection system. Since the repair method is different according to the type of defect, that is, between the extrusion and intrusion defects, the type of the defect, including determination between the extrusion and intrusion defects and the coordinates of the defect are added to the defect information list.

The effect of this embodiment is the same as in embodiment 1. That is, the fluctuation values of the positional coordinates occurring in the inspection process are acquired by providing the position error-correcting unit. The position errors of the mask patterns can then be reduced by correcting the positional coordinates of the patterns based on the fluctuation values of the positional coordinates. Moreover the relative positional relationship between the mask and the position error-correcting unit can be corrected. Before the inspection process, the position of the mask is measured by the distance sensor fixed at the position error-correcting unit, then using the result, the relative positional relationship between the mask and the position error-correcting unit is corrected, thereby, a more accurate position of the mask pattern can be known.

Embodiment 7

The inspection system of a seventh embodiment has a structure similar to the inspection system 100 of the first embodiment, but a difference from the inspection system 100 thereof lies in that the position error-correcting unit 10 is provided with a white pattern for light amount calibration. Incidentally, it is also possible to configure the inspection system of the seventh embodiment to have a structure in which the position error-correcting unit 10 in the third embodiment (the inspection system 100' in FIG. 8) or the fourth embodiment (the inspection system 100" in FIG. 17) is provided with the above white pattern.

Figure 18:
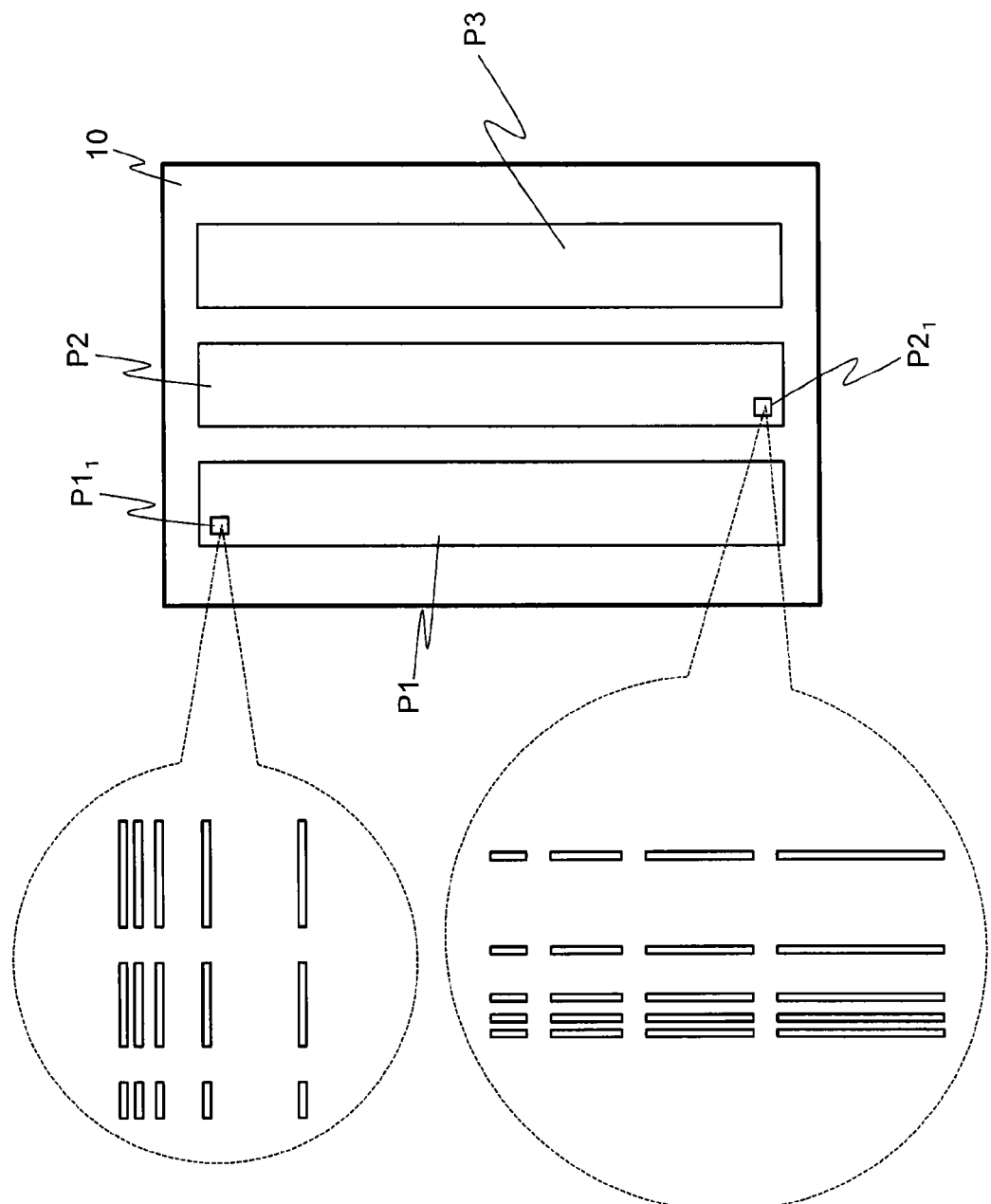
FIG. 18 is an example of a pattern of a position error-correcting unit according to embodiment 7.

FIG. 18 is a schematic diagram of patterns provided o the position error-correcting unit 10. The individual components of FIG. 18 are the same as shown in FIG. 16.

As shown in FIG. 18, the position error-correcting unit 10 is provided with a region P3 composed of white patterns, in addition to the regions P1 and P2 composed of line patterns (in a color other than white). Then, as in the cases of the first to sixth embodiments, the inspection region of the mask 101 is virtually divided by a plurality of stripes, and the regions P1, P2, and P3 in the position error-correcting unit 10 are also virtually divided by these stripes.

By providing the region P3 consisting of a white pattern on the position error-correcting unit 10, a range of light amount serving as a base for determination as to whether or not the inspection result will be correct, can be calibrated, so that inspection will always be performed correctly. Therefore, it becomes possible to reduce the position error due to improper inspection.

Next, the inspection method according to the present embodiment will be explained. In the present embodiment, the sample to be inspected is a mask, however this embodiment is not limited to this.

The inspection method of the seventh embodiment can be performed with the use of any of the inspection systems of the first, third, and fourth embodiments. In addition, the inspection method of the seventh embodiment can also be performed simultaneously with any of the inspection methods of the first to sixth embodiments.

The sample, in this case a mask, is mounted on the stage of the inspection system. In an inspection process, each pattern formed on the mask is then irradiated with light emitted from the light source disposed above the stage. The light transmitted through the mask reaches the photodiode array, thereby forming an optical image thereon. The pattern image formed on the photodiode array 105 is photoelectrically converted by the photodiode array and A/D (analog to digital) converted by the sensor circuit into an optical image. The optical image is then sent to the comparing circuit.

An image sensor is arranged in the photodiode array 105. As for the image sensor according to the present invention, a line sensor composed of CCD (charge coupled devices) cameras lined up serving as an imaging device is used. The line sensor may be, for example, TDI (Time Delay Integration) sensors.

To generate an optical image, the amount of light focusing on a photodiode array must be at the correct level in order to perform inspection properly. For example, when the light amount of the optical image is excessively low, blurring of a contour line or the like occurs, which results in difficulty in accurate reading of a line width, a distance between lines which is required for defect judgment. Therefore, inspection accuracy is lowered such that a non-defect which would not originally be determined as a defect is actually determined as a defect, while an actual defect which should be determined as a defect is actually determined as a non-defect. Similarly, when the light amount is excessively high, it becomes difficult to read a line width or a distance between lines accurately, which results in the lowering of inspection accuracy.

In view of this, before inspection the photodiode array is calibrated using white portions and black portions of the mask. In this case, undershooting and overshooting of the light amount are also taken into consideration.

However, even if the calibration is performed before inspection, there is a possibility that the amount of light will fluctuate during inspection. As to the causes of this fluctuation, there can be, as one example, fluctuation of the light source; furthermore, a white spot occurring due to a cosmic ray may be one of the causes. Since the photodiode array has sensitivity to a cosmic ray, a dot-like pseudo image (white spot) occurs on an image at a position through which the cosmic ray has passed. Since the white spot is brighter than the surrounding region thereof, occurrence of the white spot results in an increase in the amount of light on the optical image, in this situation it is difficult to determine if the white spot is an actual defect.

Further, there is a case wherein the light, which has passed through the mask, is refracted and enters a sensor different from a sensor that the light should have entered originally, which results in a change of the amount of light in the optical image. In this case, since the refracted light, in addition to the original incident light, is incident on a sensor on which the refracted light has been incident, the amount of light incident on the sensor exceeds a range of light amount, and as a result the inspection result will not be a true indication. On the other hand, since light is not sufficiently incident on a sensor on which the refracted light should be originally incident, the amount of light incident on the sensor results in a range less than the above range.

In this embodiment, correction of the position and measurement of the light amount using the position error-correcting unit is performed in parallel with the inspection step. Here, position correcting performed by means of the position error-correcting unit includes correction of the positional coordinates of the mask pattern fluctuating in the inspection process and correction of the relative positional relationship between the mask and the position error-correcting unit. Specific methods of correcting these positions are as described in the first to sixth embodiments, and therefore will not be described again.

The measurement of the light amount using the position error-correcting unit is performed using the region P3 as shown in FIG. 18. By using the white pattern of the region P3, the light amount (output of white level) of the photodiode array is checked. Incidentally, the shape of the white pattern is not particularly limited, and it may be anyone of a circular shape, a rectangular shape, a line shape, a cross shape etc. When the amount of light measured exceeds the range of light amount, which allows proper inspection, calibration of the light amount can be performed. This may be performed in real time during inspection or it may be performed after the inspection is completed.

The inspection area on the mask is virtually divided into a plurality of strip-shaped stripes by running in the X direction, where the width of each stripe in the Y direction is equal to the scan width W. The pattern on the position error-correcting unit is also virtually divided into the same stripes as ones which divide the inspection area on the mask. The movement of the stage is controlled so that each stripe is continuously scanned. Thereby an image of the mask and an image of the position error-correcting unit, having the same widths are continuously input to the photodiode array, and then the optical images are generated.

For example, when light amount amplitudes of the respective stripes are monitored from the optical image of the region P3 of the position error-correcting unit and the light amount (output of white level) of the photodiode array is found to be lowering, calibration is performed using a correcting value (gain) thereby raising the white level. This may be performed in real time during inspection or it may be performed after the inspection is completed.

In the inspection system according to the present embodiment, the inspection system 100, as shown in FIG. 1, includes a light amount calibration unit, in this case, the light amount calibration circuit can be provided instead of the fluctuation value acquiring circuit 125, the fluctuation value correcting circuit 126, and the map generating circuit 127 as shown in FIG. 1. The light amount calibration circuit is connected to the photodiode array. According to this configuration, in the light amount calibration circuit, information can be sent to the control computer 110 so as to monitor the light amount of the optical image focused on the photodiode array and adjust the correcting value in the calibration, if necessary. The control computer 110 can perform calibration to the photodiode array based upon this information.

According to such an inspection system, the optical images of the inspection region of the sample to be inspected and the position error-correcting unit can be obtained by moving the stage so that all the stripes of the inspection region and the position error-correcting unit are continuously scanned. The relative positional relationship between the mask and the position error-correcting unit can be corrected based on the optical image obtained.

Further, in the above-mentioned inspection system, actual measurement values of positional coordinates of respective patterns provided on the position error-correcting unit are obtained. Then, the position errors of the patterns occurring in the inspection process can be reduced by acquiring fluctuation values of the positional coordinates occurring in the inspection process from differences between the average values of the true values of the positional coordinates obtained in advance and the average values of the actually measured values, and correcting the positional coordinates of the patterns of the sample to be inspected using the fluctuation values. Further, a distribution of the position errors of the patterns on the sample to be inspected occurring in the inspection process can be known by generating a map of the position coordinate fluctuation values on the entire sample to be inspected.

The light amount amplitudes of the respective stripes are monitored based upon the optical image of white patterns provided on the position error-correcting unit in the inspection system according to the present embodiment. When the light amount (output of white level) of the photodiode array is found to be lowering, calibration is performed using a correcting value (gain) thereby raising the white level. Thereby, the accuracy of the inspection is maintained allowing the position errors of the mask pattern to be reduced.

The present invention is not limited to the embodiments described above and can be implemented in various modifications without departing from the spirit of the invention.

The above description of the present embodiment has not specified apparatus constructions, control methods, etc. which are not essential to the description of the invention, since any suitable apparatus constructions, control methods, etc. can be employed to implement the invention. Further, the scope of this invention encompasses all pattern inspection systems and pattern inspection methods employing the elements of the invention and variations thereof which can be designed by those skilled in the art.

What is claimed is:

1. An inspection system comprising:
    a stage on which a sample to be inspected having patterns formed on an inspection region virtually divided by a plurality of stripes is placed;
    a position error-correcting unit which is disposed on the stage in a region different from the region for placing the sample to be inspected, and has at least one pattern formed on every region virtually divided corresponding to the plurality of stripes and an alignment mark formed on a peripheral region different from the regions virtually divided;
    an optical image acquiring unit which irradiates light onto the inspection region of the sample to be inspected and onto the position error-correcting unit, and obtains optical images of the patterns formed on the inspection region of the sample to be inspected, the pattern formed on the regions virtually divided of the position error-correcting unit and the alignment mark formed on the peripheral region different from the regions virtually divided of the position error-correcting unit;
    a reference image generating unit which generates reference images corresponding to the optical images obtained from the sample to be inspected and the position error-correcting unit;
    a comparing unit which compares the optical image of the sample to be inspected and the reference image of the sample to be inspected with each other, and makes a defect judgment when a difference value between both the optical image and the reference image exceeds a predetermined threshold;
    a first deviation amount acquisition part acquiring a first deviation amount from at least the optical image of the alignment mark formed on the peripheral region different from the regions virtually divided of the position error-correcting unit, the first deviation amount representing a relative positional deviation between the sample to be inspected and the position error-correcting unit;
    a second deviation amount acquisition part acquiring a second deviation amount representing a positional deviation occurring in an inspection process with respect to a true value of positional coordinates of the pattern formed on the regions virtually divided of the position error-correcting unit; and
    a position correction part correcting a positional relationship between the sample to be inspected and the position error-correcting unit based on the first deviation amount, and obtaining a fluctuation value of positional coordinates of each pattern in the inspection region of the sample to be inspected based on the second deviation amount and correcting the positional coordinates.

2. The inspection system according to claim 1, wherein the first deviation amount acquisition part holds a true value of positional coordinates of the alignment mark, and acquires the first deviation amount from a difference between the true value and an actually-measured value of positional coordinates of the alignment mark obtained from the optical image and the reference image of the position error-correcting unit.

3. The inspection system according to claim 1, wherein the first deviation amount acquisition part overlaps an optical image of a stripe extracted from the plurality of stripes in the position error-correcting unit with a reference image corresponding to the optical image of a stripe, thereby acquiring the first deviation amount.

4. An inspection method comprising the steps of:

placing a sample to be inspected having patterns formed on an inspection region virtually divided by a plurality of stripes on a stage on which a position error-correcting unit having at least one pattern formed on every region virtually divided corresponding to the plurality of stripes and an alignment mark formed on a peripheral region different from the regions virtually divided is disposed;

virtually dividing the inspection region of the sample to be inspected by a plurality of stripes and virtually dividing the patterns of the position error-correcting unit by a corresponding plurality of stripes, and moving the stage such that all the stripes are continuously scanned of both the sample to be inspected and the position error-correcting unit to acquire optical images of the inspection region of the sample to be inspected, the pattern formed on the regions virtually divided of the position error-correcting unit and the alignment mark formed on the peripheral region different from the regions virtually divided of the position error-correcting unit;

generating reference images corresponding to the optical images obtained from the sample to be inspected and the position error-correcting unit;

comparing the optical image with the reference image of the sample to be inspected with each other, and making a defect judgment when a difference value between both the optical image and the reference image exceeds a predetermined threshold;

acquiring a first deviation amount from at least the optical image of the alignment mark formed on the peripheral region different from the regions virtually divided of the position error-correcting unit, the first deviation amount representing a relative positional deviation between the sample to be inspected and the position error-correcting unit;

acquiring a second deviation amount representing a positional deviation occurring in an inspection process with respect to a true value of positional coordinates of the pattern formed on the regions virtually divided of the position error-correcting unit; and correcting a positional relationship between the sample to be inspected and the position error-correcting unit based on the first deviation amount; and obtaining a fluctuation value of positional coordinates of each pattern in the inspection region of the sample to be inspected based on the second deviation amount and correcting the positional coordinates.

5. The inspection method according to claim 4, wherein the step of acquiring the second deviation amount comprising the steps of:

obtaining an average value of true values of the patterns contained in a predetermined region from the true values of positional coordinates of the patterns formed on the regions virtually divided of the position error-correcting unit;

obtaining actually-measured values of positional coordinates of the pattern formed on the regions virtually divided of the position error-correcting unit from the optical image and the reference image of the position error-correcting unit, and obtaining an average value of the actually-measured values of the pattern contained in the predetermined region; and acquiring the second deviation amount from a difference between the average value of the true values and the average value of the actually-measured values.

* * * * *